(12) United States Patent
Tomioka et al.

(10) Patent No.: US 7,974,654 B2
(45) Date of Patent: Jul. 5, 2011

(54) COMMUNICATION APPARATUS PERFORMING KEY FEATURE EXTRACTION FOR COGNITIVE RADIO SYSTEM

(75) Inventors: Tazuko Tomioka, Kawasaki (JP); Keiichi Yamaguchi, Kawasaki (JP); Tomoya Horiguchi, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1007 days.

(21) Appl. No.: 11/888,559

(22) Filed: Aug. 1, 2007

(65) Prior Publication Data
US 2008/0161035 A1 Jul. 3, 2008

(30) Foreign Application Priority Data

Dec. 28, 2006 (JP) ................. 2006-354850

(51) Int. Cl. *H04M 1/00* (2006.01)
(52) U.S. Cl. .......... 455/550.1; 370/328; 370/329; 370/332; 370/338; 370/450; 455/69; 455/423; 455/450; 455/522
(58) Field of Classification Search .......... 370/338, 370/332, 328; 455/69, 450, 522, 550.1
See application file for complete search history.

(56) References Cited

U.S. PATENT DOCUMENTS

| 7,263,333 | B2 * | 8/2007 | Roberts | 455/67.13 |
|---|---|---|---|---|
| 7,627,326 | B1 * | 12/2009 | Miller, II | 455/454 |
| 2004/0047324 | A1 * | 3/2004 | Diener | 370/338 |
| 2006/0084444 | A1 * | 4/2006 | Kossi et al. | 455/450 |
| 2006/0171445 | A1 * | 8/2006 | Batra et al. | 375/130 |
| 2006/0281404 | A1 * | 12/2006 | Lee et al. | 455/11.1 |
| 2007/0053410 | A1 * | 3/2007 | Mahonen et al. | 375/130 |
| 2007/0086396 | A1 * | 4/2007 | Alapuranen | 370/338 |
| 2008/0013517 | A1 * | 1/2008 | Buchwald et al. | 370/343 |
| 2008/0130534 | A1 | 6/2008 | Tomioka | 370/310 |

FOREIGN PATENT DOCUMENTS

| JP | 2004-336729 | 11/2004 |
|---|---|---|
| JP | 2005-269480 | 9/2005 |

OTHER PUBLICATIONS

Kitagawa, et al., "Development of the Radio Identification Prototype System Using FM Analysis Algorithm", The Institute of Electrtonics, Information and Communication Engineers, IEICE Technical Report, Jul. 21, 2005, vol. 105, No. 217, SR2005-39, pp. 125-129.
Search Report from corresponding JP 2006-354850 dated Nov. 18, 2008.
U.S. Appl. No. 11/499,669, filed Aug. 7, 2006, Tomioka.

* cited by examiner

*Primary Examiner* — Rafael Pérez-Gutiérrez
*Assistant Examiner* — Liton Miah
(74) *Attorney, Agent, or Firm* — Ohlandt, Greeley, Ruggiero & Perle, L.L.P.

(57) ABSTRACT

A communication apparatus, includes unit extracting a reception key feature of a temporal change in received power in each frequency band contained in a received signal, unit storing, in correspondence with one another, a system name of a system which uses the frequency band, event information indicating that a communication apparatus belonging to the system starts or stops transmission, and a transmission key feature of a temporal waveform change shape of a transmission signal from a communication apparatus belonging to the system, a transmission key feature corresponding to the event information, unit determining whether there is any transmission key feature matching the reception key feature, by comparing the reception key feature with the transmission key feature, and unit selecting, when the determination unit determines that there is a matched transmission key feature, the event information and the system name which correspond to the transmission key feature from the storage unit.

16 Claims, 13 Drawing Sheets

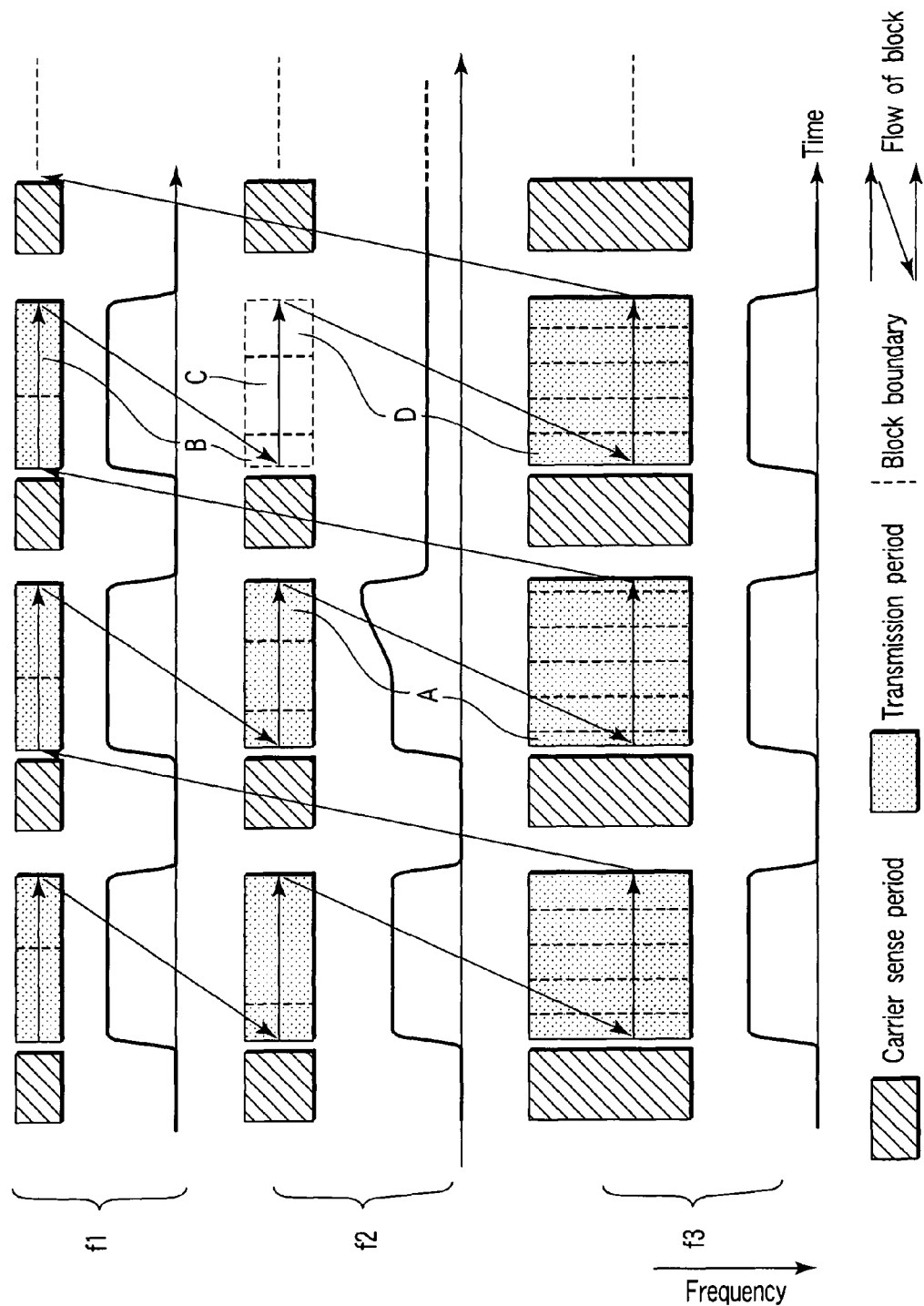
F I G. 6

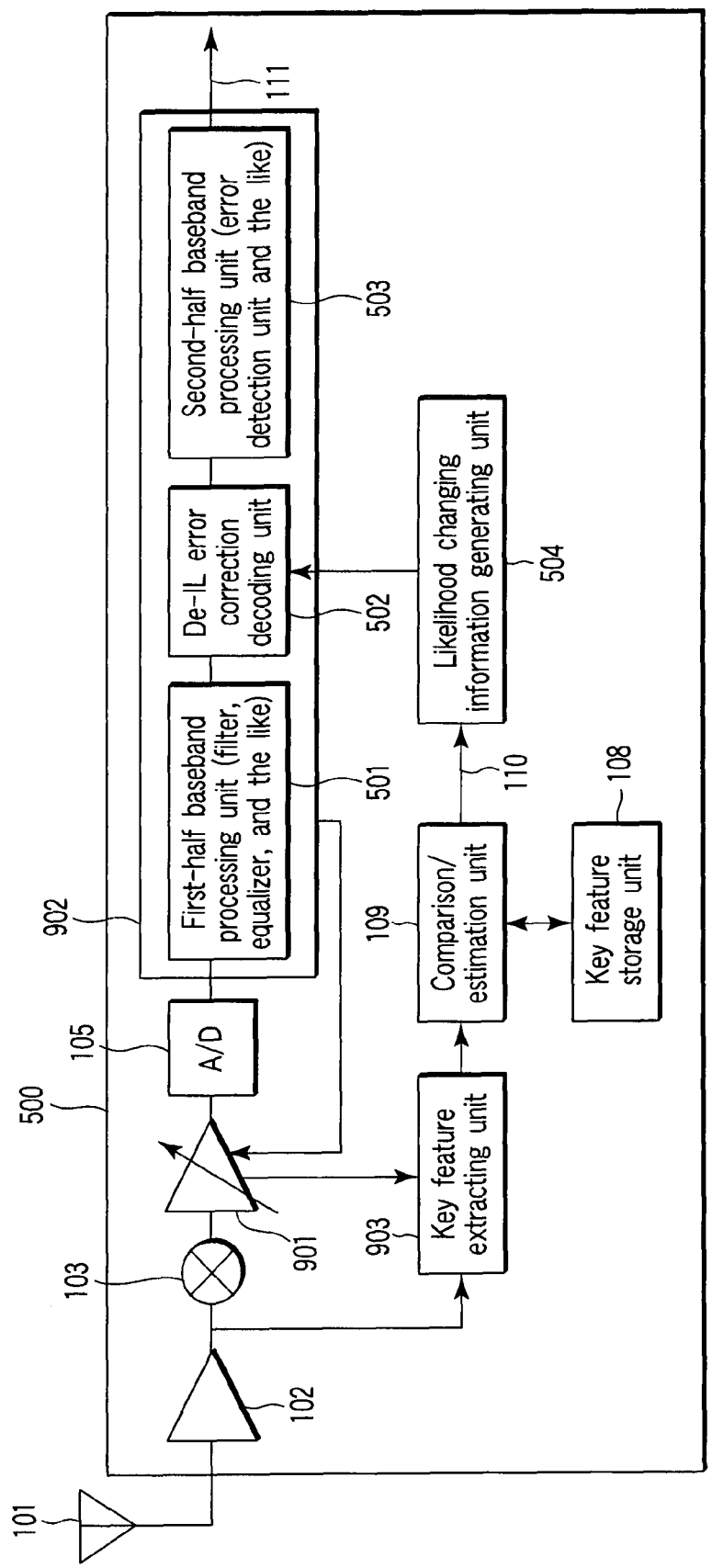
F I G. 9

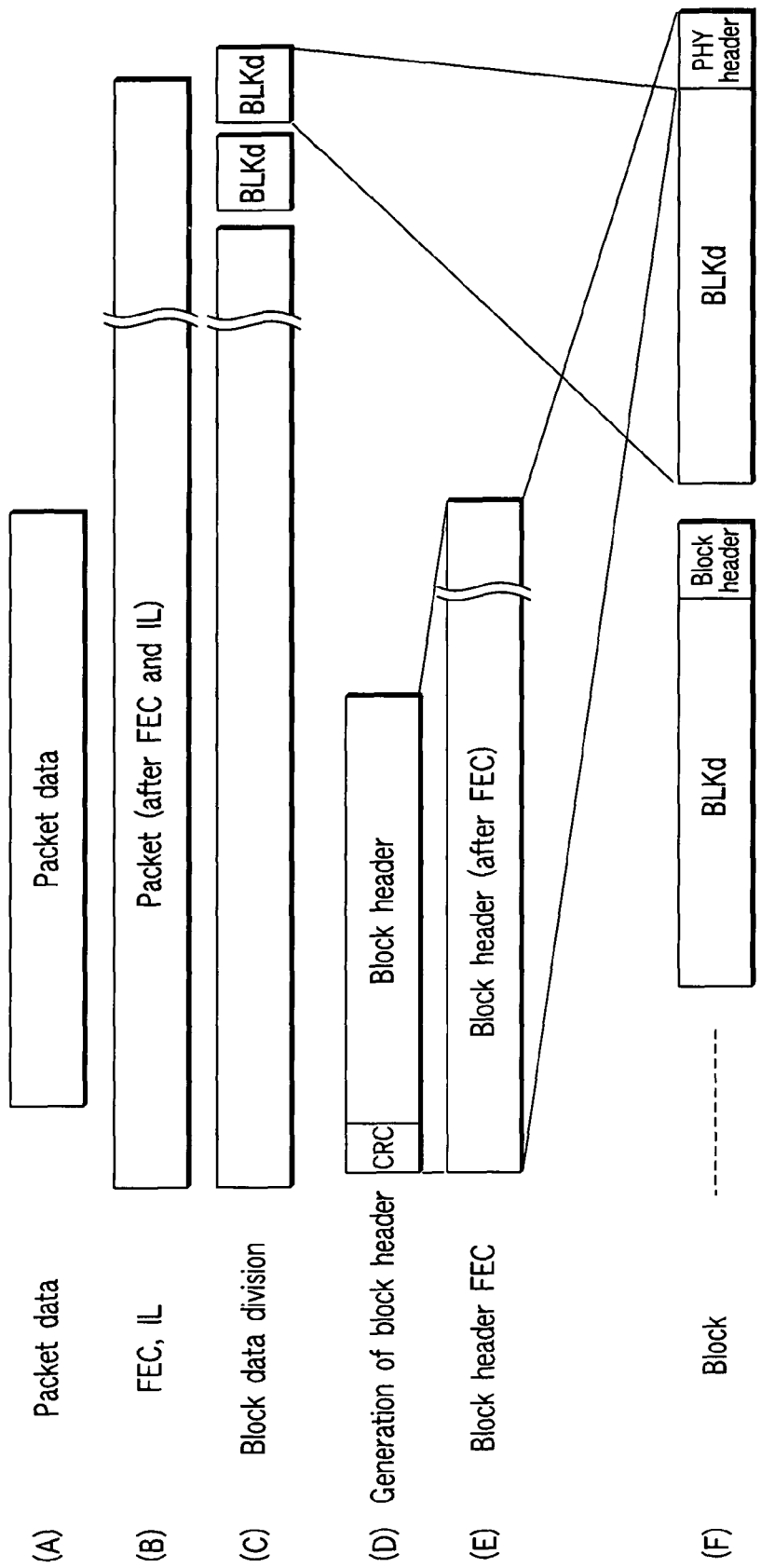
F I G. 10

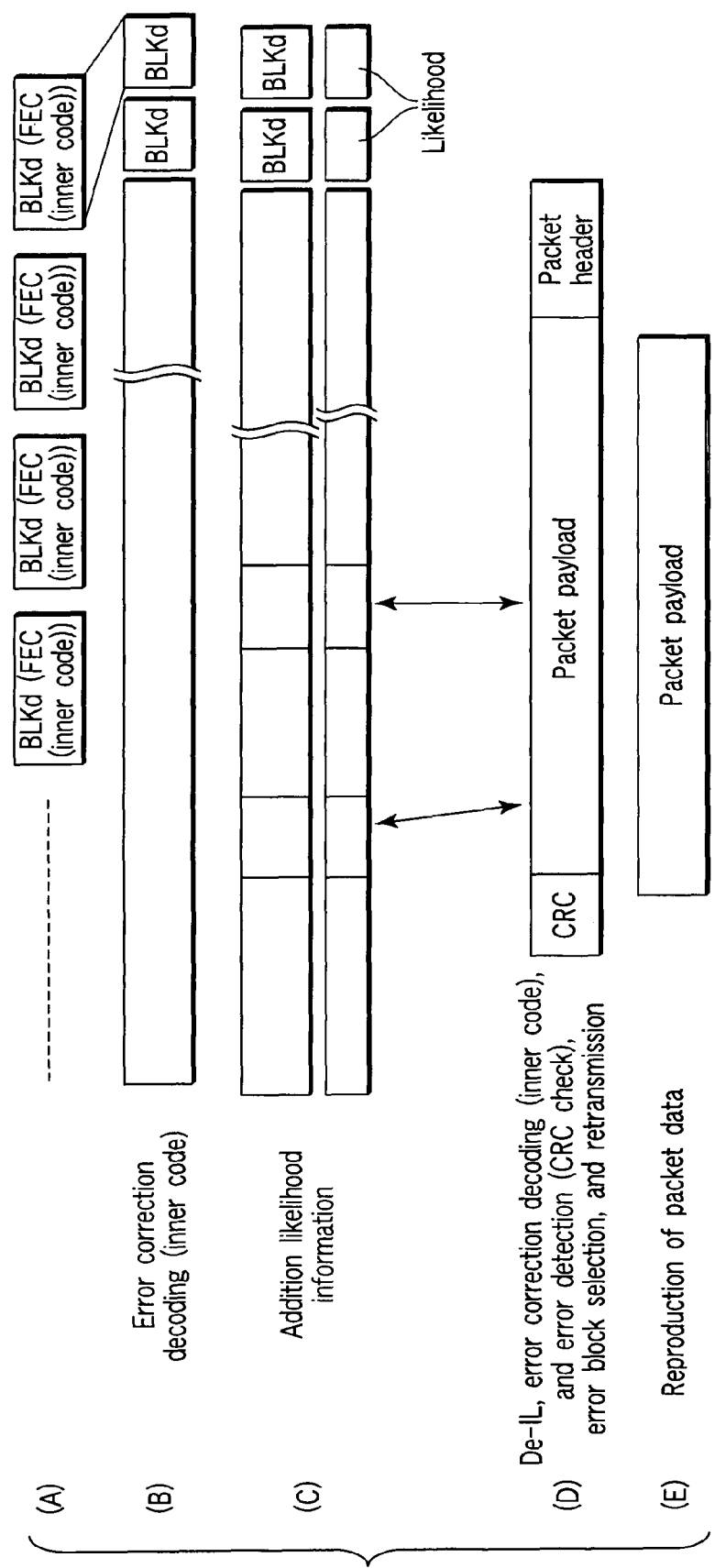
F I G. 13

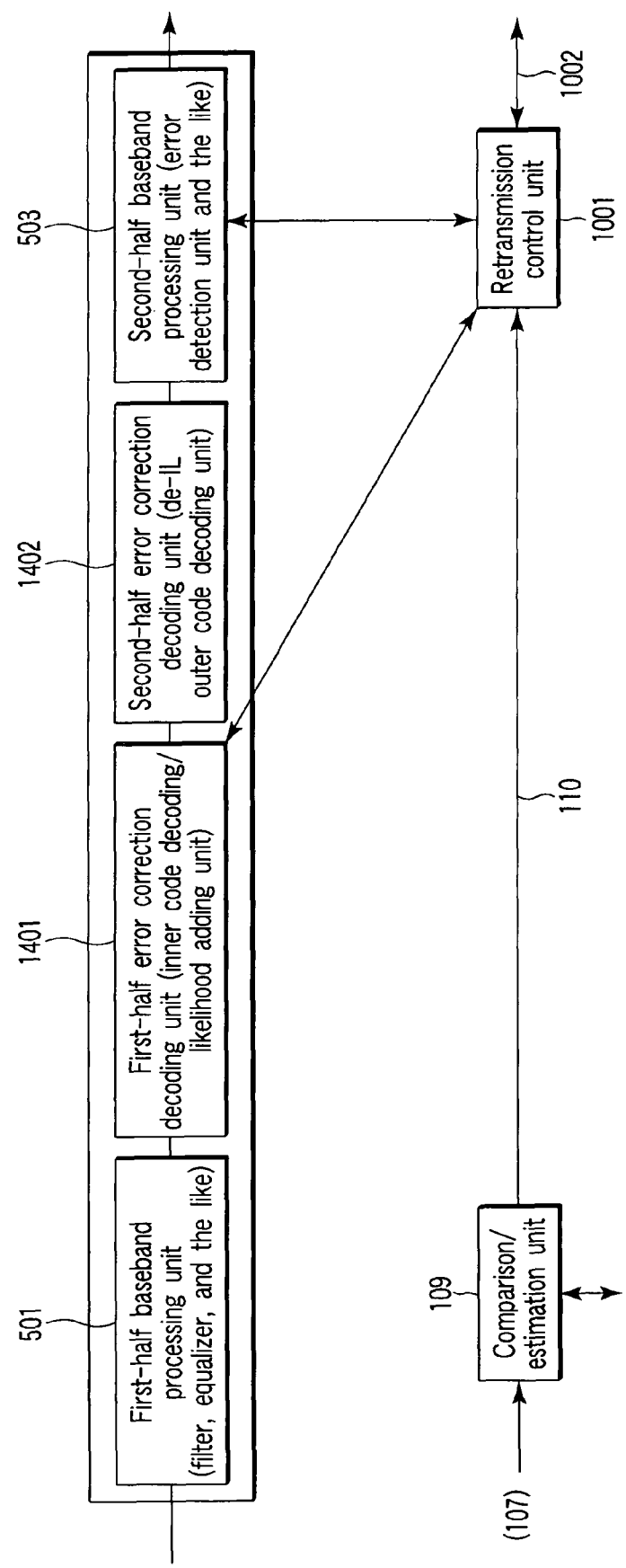
F I G. 14

COMMUNICATION APPARATUS PERFORMING KEY FEATURE EXTRACTION FOR COGNITIVE RADIO SYSTEM

CROSS-REFERENCE TO RELATED APPLICATIONS

This application is based upon and claims the benefit of priority from prior Japanese Patent Application No. 2006-354850, filed Dec. 28, 2006, the entire contents of which are incorporated herein by reference.

BACKGROUND OF THE INVENTION

1. Field of the Invention

The present invention relates to a communication apparatus in a radio communication system which shares frequency bands with other systems.

2. Description of the Related Art

With the progress of the information-oriented society, communication means which users can use in daily life have increased dramatically in number, and their communication speeds have also increased considerably. In order to increase the communication speeds, defining a method of using media in a manner different from the conventional manner have been proposed. In most radio communications, specific bands has been limited to be used by specific applications, according to the related regulation. However, several bands have been open to a plurality of applications without the need for any license. Recently, a very wide band, such as a band for UWB (Ultra Wideband) system, has been determined to be opened, limited to low-power short-range communication, overlaping with other applications. In such a case, however, a given communication is likely to become an interference wave with respect to another application.

According to regulation concerning UWB, when using a frequency which is not very robust against interference waves, a given system is obliged to stop transmission upon detecting a radio wave from a system having a license for the UWB frequency, i.e., a system having priority of use. Such a method is called DAA (Detect And Avoid). The concept of DAA is included in the concept of cognitive radio communication in a wide sense. Cognitive radio communication is a scheme of adapting to an environment by sensing and recognizing the environment. If it is defined that a target to be recognized is the use state of frequencies in a surrounding area and the method of adapting to an environment is to stop transmission upon detection of transmission from a licensed terminal, this method is equivalent to DAA.

Such a method is required to protect a system having priority. On the other hand, an abrupt stopping of transmission affects the communication performance on the cognitive side. A radio transceiver for video transmission detects a communication state and issues a retransmission request on the basis of the detected communication state (see, for example, JP-A 2004-336729 (KOKAI)). A communication state includes the electric field strength and error rate of a received radio wave and their temporal changes.

JP-A 2004-336729 (KOKAI) discloses a method using the electric field strength of a radio wave as a method of detecting the superimposition of interference from another system on transmission from a self system. However, this reference does not disclose anything about what kind of change is detected as a temporal change in electric field strength and how to improve the detection performance as compared with the case of simply detecting an electric field strength.

A cognitive radio communication system stops transmission at a given frequency immediately when a terminal having a license starts transmission on the same frequency. At this time, in most cases, the notification of transmission stopping from the transmitter does not reach the receiver on time before the receiver demodulates the signal in the frequency. As a consequence, the receiver may erroneously demodulate transmission from the licensed terminal instead of a signal from the cognitive transmitter. When the receiver performs error correction decoding at a likelihood corresponding to bit energy, the error correction performance deteriorates. A system subjected to changes in transmit/receive behavior in accordance with causes of interference, e.g., a cognitive radio communication system, is required to detect the cause of deterioration instead of simply detecting deterioration in communication performance.

BRIEF SUMMARY OF THE INVENTION

According to an aspect of the invention, there is provided a communication apparatus, comprising: an extraction unit configured to extract a reception key feature of a temporal change in received power in each frequency band contained in a received signal; a storage unit configured to store, in correspondence with one another, a system name of at least one system which uses the frequency band, event information indicating that a communication apparatus belonging to the system starts or stops transmission, and at least one transmission key feature of a temporal waveform change shape of a transmission signal from a communication apparatus belonging to the system, at least one transmission key feature corresponding to the event information; a determination unit configured to determine whether there is any transmission key feature matching the reception key feature, by comparing the reception key feature with the transmission key feature; and a selection unit configured to select, when the determination unit determines that there is a matched transmission key feature, the event information and the system name which correspond to the transmission key feature from the storage unit.

BRIEF DESCRIPTION OF THE SEVERAL VIEWS OF THE DRAWING

FIG. 6 is a view for explaining a frequency usage form effective for the communication apparatus of this embodiment;

FIG. 9 is a block diagram showing the communication apparatus of this embodiment when a key feature is detected for each time slot by using a VGA control signal;

FIG. 10 is a view for explaining an example of the operation of the communication apparatus of this embodiment when it is applied to retransmission;

FIG. 13 is a view for explaining an example of the operation of the communication apparatus of this embodiment when it is applied to retransmission; and FIG. 14 is a block diagram showing a communication apparatus according to a modification of the apparatus in FIG. 11.

DETAILED DESCRIPTION OF THE INVENTION

A communication apparatus according to an embodiment will be described in detail below with reference to the views of the accompanying drawing. Note that the following drawing will show only portions essentially associated with the operation of the embodiment, and those which are not directly associated with the embodiment will not be illustrated.

According to the embodiments, when received signal power changes, the communication apparatus of the embodiment detects the cause of the change, and properly copes with the cause, thereby preventing deterioration in communication performance.

A receiver as the communication apparatus of this embodiment has the knowledge of, in advance, ramp-up waveforms from licensed terminals in a reception frequency band at the start of transmission. The receiver also has the knowledge of, in advance, the shape of change in power when the cognitive transmitter stops transmission. The communication apparatus of this embodiment distinguishes an artificial change such as the abrupt stop of transmission from a cognitive transmitter accompanying the start of transmission from a licensed terminal, in temporal changes in transmitted power, by collating a change in power with these waveforms and shapes.

This allows the receiver of this embodiment to discriminate an artificial change such as the stop of transmission of a cognitive terminal accompanying transmission of a licensed terminal from a change as a natural phenomenon such as a reduction in received power due to fading. This can improve the demodulation performance afterward. In addition, performing this detection together with error detection allows the receiver to improve the accuracy in selecting a block for which a retransmission request is to be issued, thus improving the communication performance.

Figure 1:
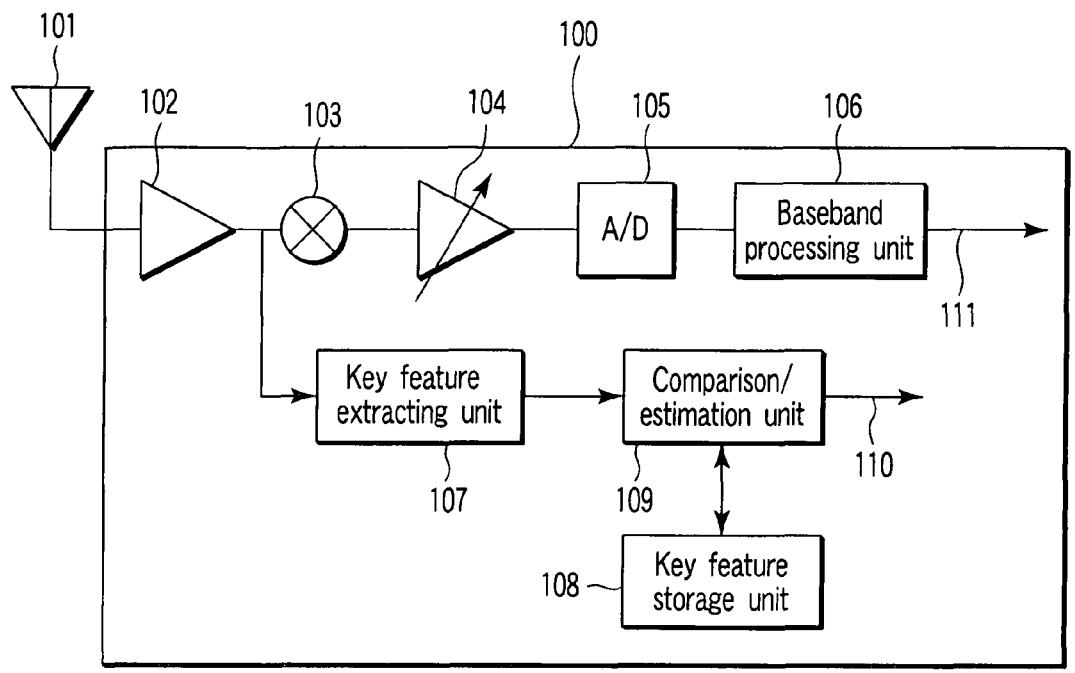
FIG. 1 is a block diagram showing a typical communication apparatus of an embodiment.

FIG. 1 is a typical block diagram of the receiver of this embodiment.

A receiver 100 is, for example, a receiver of a cognitive radio system. A transmitter which transmits to this receiver has a function of stopping transmission upon detecting a radio wave from a terminal (to be referred to as a licensed terminal hereinafter) of a communication system (to be referred to as a licensed system hereinafter), which has the priority of use in the operating frequency band.

Figure 2:
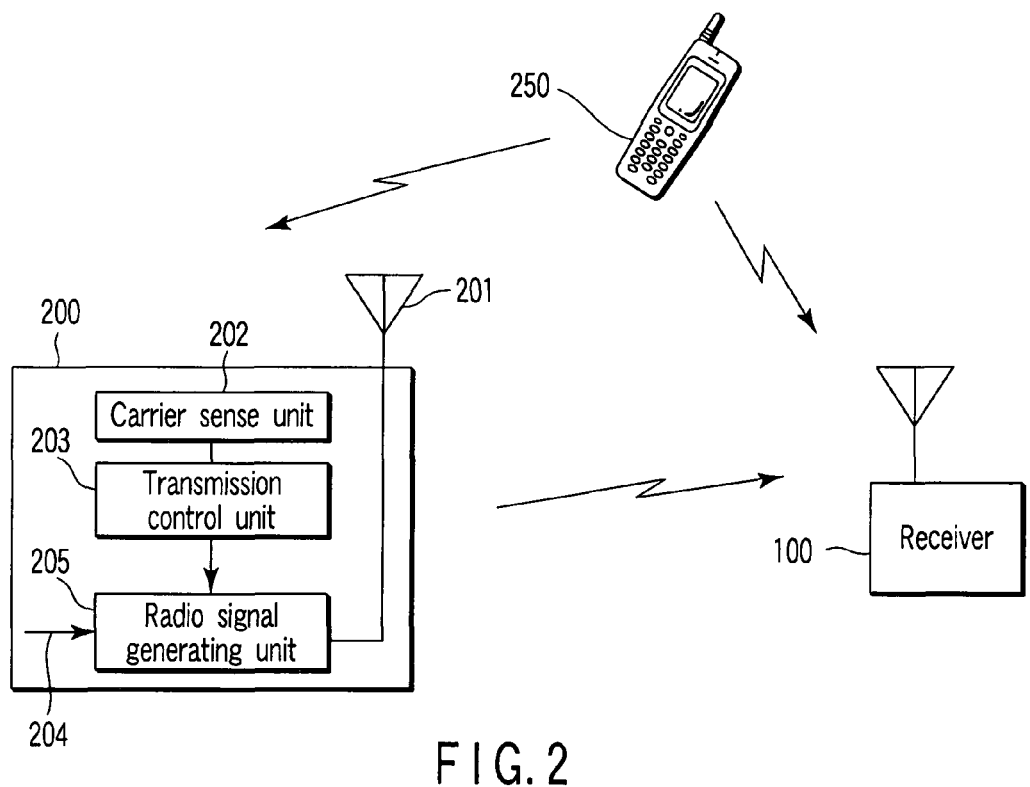
FIG. 2 is a view showing the operating environment of the communication apparatus of this embodiment.

FIG. 2 is a schematic view showing the operation of a communication system to which a cognitive transmitter 200 and the cognitive receiver belong. The cognitive transmitter 200 is transmitting to the receiver 100 of this embodiment, and a licensed system terminal 250 of the frequency band which the cognitive transmitter 200 may use exists within the reach of radio waves. The transmitter 200 converts data input through a data input terminal 204 into a radio signal in a proper shape by using a radio signal generating unit 205, and radiates the signal from an antenna 201. The transmitter 200 further includes a carrier sense unit 202 to periodically perform carrier sensing in the frequency band which the transmitter 200 uses. If, for example, transmission from the licensed system terminal 250 is detected as a result of carrier sensing, a transmission control unit 203 controls the radio signal generating unit 205 so as to stop the use of the frequency band. In such a case, the receiver 100 experiences two events, i.e., inability to properly receive a signal from the transmitter 200 and starting to receive interference by a radio wave from the licensed system terminal 250 if the receiver 100 is located in the reach of radio waves from the licensed terminal.

This embodiment provides, for the receiver 100, an arrangement for detecting such an artificial event, i.e., an intentional event which is clearly different from a change in propagation environment, e.g., fading or shadowing, and an arrangement for improving communication performance by using the above arrangement. The arrangement of the receiver shown in FIG. 1 will be described below.

A preamplifier (LNA: Low Noise Amplifier) amplifies a radio wave received by an antenna 2. A down converter 103 converts the amplified signal into a baseband signal. The down converter 103 includes not only a mixer but also various kinds of functions necessary for frequency conversion, e.g., a filter, a local oscillator, and a gain adjustment function as needed, and is configured to convert a desired frequency band into the input band of an analog/digital (A/D) converter 105. The down converter 103 may have a two-stage arrangement, as needed. That is, the down converter 103 may have a superheterodyne receiver arrangement. A gain adjustment amplifier (VGA: Variable Gain Amplifier) 104 adjusts the signal converted into the baseband signal within an amplitude range suitable for A/D conversion. The A/D converter 105 then converts the resultant signal into a digital signal. A baseband processing unit 106 demodulates the obtained digital signal to extract data contained in the signal, and outputs the data from the data output terminal 111.

Meanwhile, an output from an LNA 102 branches to a key feature extracting unit 107 which extracts the key feature of a temporal change in received power. The key feature extracting unit 107 extracts the key feature of a temporal change in received power from the input signal with respect to the reception frequency band of the receiver. Thereafter, a comparison/estimation unit 109 detects whether the received power has changed over time.

Several types of key features are available, and a combination thereof can be used. A typical key feature is the shape of a change in received power itself. In addition, this apparatus can use, as a key feature, a derivative value in the shape of change in the temporal waveform of received power, a combination of a derivative and an integral value (averaged value), or the like. Key features will be described in detail later with reference to FIGS. 7 and 8 and the like.

The receiver 100 also has a key feature storage unit 108. The key feature storage unit 108 stores the key feature or a combination of a plurality of key features of received power of a transmission signal transmitted from a terminal of a communication system to be detected, at the occurrence of an event such as a transmission start or transmission stop, in set with the communication system name and the event. These key features are also termed transmission key features, which are stored together with the frequency bands in which target communication systems perform communication.

The key feature extracting unit 107 outputs the key feature to the comparison/estimation unit 109. The comparison/estimation unit 109 extracts one of the key features stored in the key feature storage unit 108 which is stored in set with an event associated with a communication system which may use the frequency band of interest, and compares the extracted key feature with the detected key feature. If the detected key feature matches one or more of the stored key features as a result of the comparison, the comparison/estimation unit 109 determines that a temporal change estimated as an artificial change is detected in the received power in the reception frequency band, and outputs information indicating the communication system and event which correspond to the matched key feature from a comparison result output terminal 110.

Figure 3:
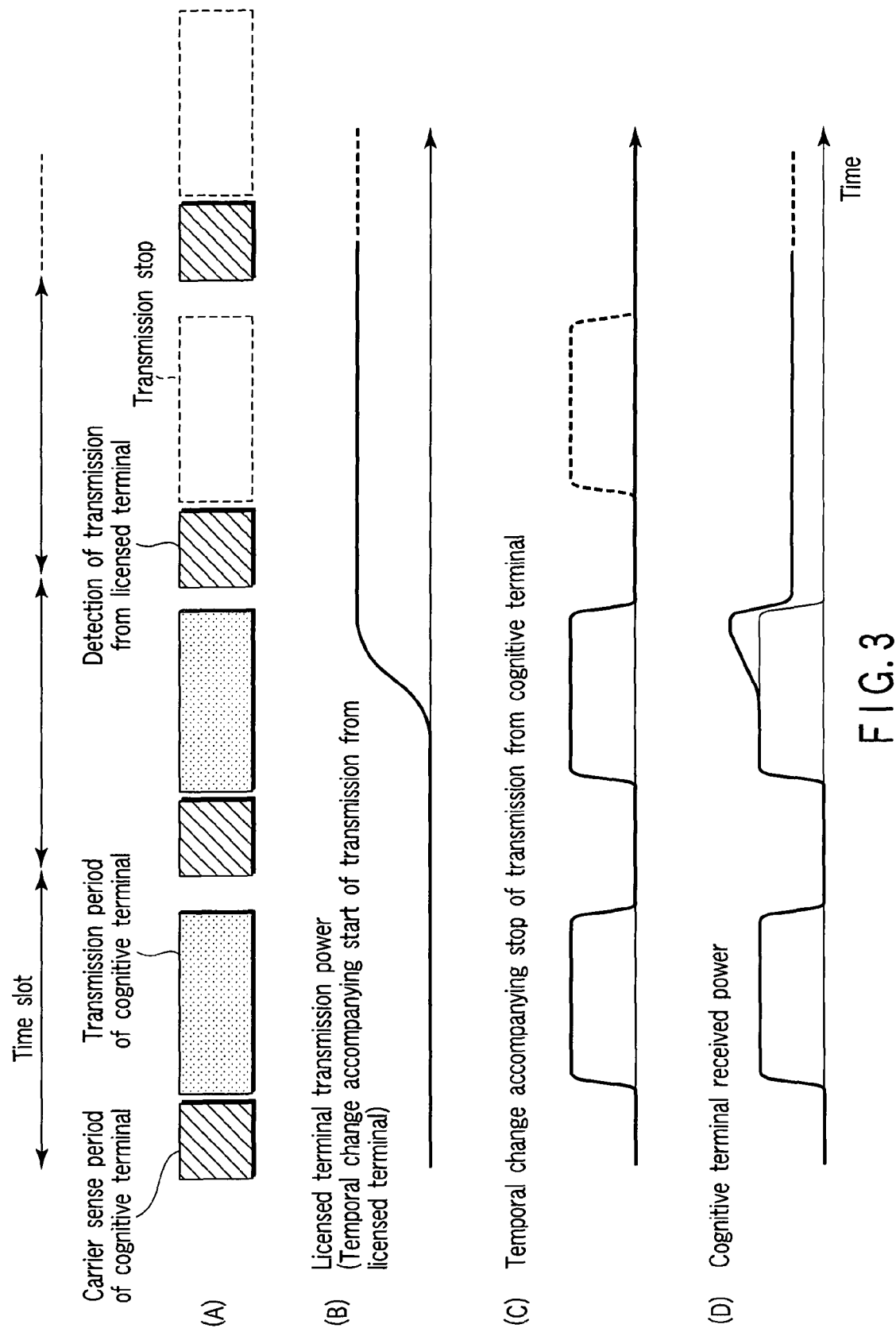
FIG. 3 is a view for explaining an example of the operation of the communication apparatus in FIG. 1.

A specific example of the operation of the receiver in FIG. 1 will be described next with reference to (A) to (D) of FIG. 3. The horizontal axis of (A) to (D) of FIG. 3 represent the time. (A) of FIG. 3 shows a method of using a given frequency band. In this frequency band, the cognitive transmitter and the receiver use the time upon dividing it into time slots. One time slot comprises a predetermined carrier sense period, a succeeding transmission period, and some guard time between them. The transmitter 200 performs reception in the frequency band of interest in a carrier sense period. Upon detecting no transmission estimated as a transmission from a licensed terminal during this period, the transmitter 200 performs transmission in the succeeding transmission period. The transmitter 200 repeats this operation for each time slot.

Assume that the licensed terminal has started transmission in the frequency band of interest, as shown in (B) of FIG. 3. (B) of FIG. 3 shows the shape of a power change when the licensed terminal starts transmission. Note that in many cases, the receiver 100 does not observe this shape as it is.

(C) of FIG. 3 shows how the transmitted power of the transmitter 200 changes. The transmitter 200 outputs power only in a period corresponding to a transmission period in a time slot. Note that the leading edge/trailing edge of power at the start/end of a transmission period is moderate to suppress spectrum spreading and spurious radiation which occur when the leading edge/trailing edge becomes steep. Such a moderate leading edge/trailing edge is called a ramp-up/ramp-down, which is used in most radio transmitters whose spectrum masks are defined, as well as a cognitive terminal. Likewise, the licensed terminal in (B) of FIG. 3 performs ramp-up/ramp-up operation. (B) of FIG. 3 shows a ramp-up shape at the start of transmission.

In many cases, such a ramp-up/ramp-down period is determined by the specifications of a communication system to which the terminal belongs. A ramp-up/ramp-down period is generally set to the minimum period which satisfies a spectrum mask. In many cases, if a period is determined by the specifications, the shape of a power change within the period is also shaped within a predetermined range. That is, complying with the same specifications and mask, the transmitter obtains a similar shape regardless of the implementation method.

When the licensed terminal with respect to the frequency of interest starts transmission at the timing shown in (B) of FIG. 3, the transmitter 200 cannot detect this during the transmission period. The transmitter 200 therefore performs transmission to the end of the transmission period in the time slot as indicated by the second ramp from the left in (C) of FIG. 3. The transmitter 200 detects the transmission from the licensed terminal in the carrier sense period in the next time slot, and hence stops transmission in the next transmission period. The transmitter 200 further detects the continuation of transmission from the licensed terminal in the carrier sense period in the next time slot, and hence keeps stopping transmission.

When the transmitter 200 performs such operation, the shape of a change in transmission power is such that a predetermined power is periodically output until the stop of transmission, and no power is output after the stop of transmission, as shown in (C) of FIG. 3. Since the transmitter 200 does not stop transmission during a transmission period, transmission power is always continuously detected in a transmission period corresponding to one time slot.

Note that there may be a communication system which differs in system arrangement from that described above and abruptly stops transmission during a transmission period. For example, in such a system, a transmitter has a function of stopping transmission upon receiving a notification of the possibility of interference with a licensed system from another terminal in addition to its carrier sense detection result. In such a case, this system may take an arrangement in which the key feature storage unit 108 stores a ramp-down waveform from the transmitter in advance, and when a change in received power is detected, the change is compared with a key feature corresponding to the ramp-down waveform.

On the other hand, the receiver 100 receives a radio wave obtained by adding these transmissions at a proper ratio in the frequency band of interest, as shown in (D) of FIG. 3. In the transmission period in the second time slot, in addition to the transmitted power of the transmitter 200, which is to be received, the received power is increased in a waveform corresponding to the ramp-up waveform from the licensed terminal during this transmission period. In the next time slot, the transmitter 200 stops transmission, and hence the receiver receives only a transmission from the licensed terminal.

The receiver 100 of this embodiment has, in advance, the knowledge of a licensed system corresponding to each frequency band. More specifically, the key feature storage unit 108 stores in advance ramp-up waveforms from licensed terminals belonging to the licensed system, and further, key features corresponding to the ramp-down waveforms of the terminals depending on the arrangement of the receiver 100. As described above, since ramp-up waveforms corresponding to the specifications of one system are similar to each other, the key feature storage unit 108 stores key features with a range including possible ramp-up waveforms in advance. Preferably, the key feature storage unit 108 stores not only key features but also the waveforms themselves.

Upon detection of a change in key feature which is estimated as a change in received power during reception in a given frequency band, the comparison/estimation unit 109 extracts the shape of a temporal waveform change shape which may occur in the frequency band from the key feature storage unit 108, and compares the shape with the detected change. That is, the comparison/estimation unit 109 compares the detected shape with the key features of artificial changes such as the start of transmission from a licensed terminal in the frequency band or the stop of transmission from the transmitter 200, or, if an unartificial change such as fading or shadowing is to be detected, with a corresponding key feature. If the comparison result obtained by the comparison/estimation unit 109 falls within a range in which a match can be estimated, an event and a communication system indicated by the key feature are specified. The comparison/estimation unit 109 specifies an event, i.e., whether the event is a transmission start or a transmission stop, and a communication system, i.e., whether the system which has started or stopped transmission is a cognitive system or a licensed system, and further specifies a specific licensed system because a plurality of licensed systems may exist in one frequency band which a cognitive system uses.

According to the change shape example shown in (D) of FIG. 3, the comparison/estimation unit 109 compares the key feature obtained from the waveform of a detected received-power change with key features corresponding to the waveforms in (B) and (C) of FIG. 3 stored in the key feature storage unit 108, and estimates that the obtained key feature matches both of them. The comparison/estimation unit 109 then outputs the result from the comparison result output terminal 110.

If there are a plurality of types of licensed systems in the frequency band of interest, the comparison/estimation unit 109 compares key features corresponding to the plurality of licensed systems. Although it depends on the types of key features and the comparing method to be used, if a received radio wave is weak or buried in noise, it may be impossible to determine any specific one of the licensed systems. Even if there is only one type of licensed system, it may be impossible to determine that the detected transmission is from the licensed system, when the transmission is buried in noise.

The comparison/estimation unit 109 therefore may output the comparison/estimation result in the form of indicating which events and at what probabilities the detected key feature matches. For example, if the key feature storage unit 108 stores a plurality of events corresponding to the frequency band, the comparison/estimation result may indicate, for example, specific matching rates with respect to a given event and another event.

If the comparison/estimation unit 109 is to output the matching rates to plurality of licensed systems, the unit preferably outputs the probability of a match with any one of the plurality of licensed systems. That is, the comparison/estimation unit 109 outputs the result in the form of indicating that the detected power change matches any one of the licensed systems at a probability of α%. This makes it possible to determine that the probability of being an unlicensed system or noise is (100−α) %. Depending on the value of α, the transmitter can be notified of detection result, and the transmitter can use the information, for example, for cancel the transmission stop.

The purpose of providing the receiver of this embodiment is, in particular, to accurately determine as quickly as possible whether the transmitter 200 has stopped transmission. Therefore, the embodiment performs judgment of, without exception, whether a detected power change matches a transmission stop waveform from the transmitter 200. In addition, the embodiment also determines whether a licensed system has started transmission. This is because confirming this fact makes it possible to determine that the transmitter 200 has stopped transmission at a higher probability. In addition, this determination allows proper processing for a signal whose noise has increased due to interference. Furthermore, when the transmitter has stopped transmission upon detection of transmission from a system, other than a licensed system, for which it is not necessary to stop transmission, letting the receiver notify the transmitter of the detection result will help to determine whether to cancel the transmission stop.

Figure 5:
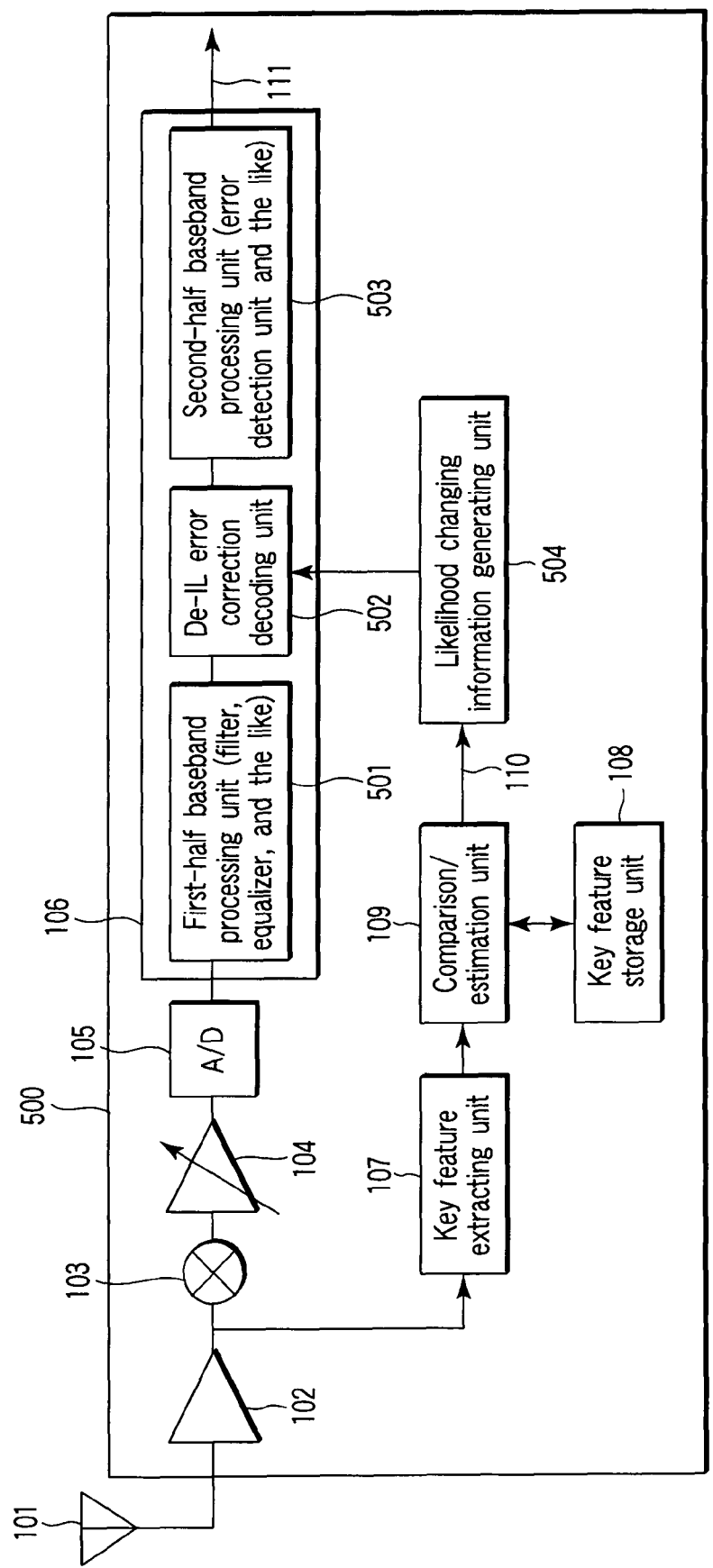
FIG. 5 is a block diagram showing a communication apparatus which uses a key feature detection result to improve the error correction performance.

The form of using an artificial change in received power detected in this manner and an estimated event and system will be described next. FIG. 5 shows the form of using a detection result to improve error correction performance. FIG. 5 differs from FIG. 1 in that it shows part of the contents of the baseband processing unit 106 and the route in which a comparison result is used for processing in the baseband processing unit 106.

The baseband processing unit 106 outputs a digital data bit string by demodulating the raw radio signal having undergone down-conversion to a baseband signal and conversion to a digital signal in the A/D converter 105. Most radio receivers have an error correction decoding unit in a portion which converts a symbol string into a bit string of identified 1 and 0, although a description of the detailed contents of the unit will be omitted because the contents greatly vary depending on communication systems.

Referring to FIG. 5, a first-half baseband processing unit 501 including a filter, an equalizer, an FFT unit in the case of OFDM, and the like processes an A/D-converted signal up to a state which allows error correction decoding. A de-IL error correction decoding unit 502 then performs deinterleaving and error correction decoding of the signal. A second-half baseband processing unit 503 further performs processing such as error detection with respect to the output from the de-IL error correction decoding unit 502, as needed, converts the resultant signal into a bit string in a proper form, and outputs it from a data output terminal 111.

Meanwhile, the comparison/estimation unit 109 outputs information to a likelihood changing information generating unit 504. At this time, if the received power has changed, the comparison/estimation unit 109 outputs information indicating that the change corresponds to which kind of event caused by which kind of communication system. When such information is to be used to improve the error correction performance, the comparison/estimation unit 109 preferably outputs, together with this information, information indicating a power ratio of a signal that should be received and the total power.

In error correction, the likelihood changing information generating unit 504 generates information for making the degree of reliability of a portion of a signal whose S/N ratio is actually lower than an estimated value be rated low. As the likelihood increases, the de-IL error correction decoding unit 502 performs error correction of a signal with higher reliability on its S/N ratio. The likelihood changing information generating unit 504 generates information for changing this likelihood, and supplies it to the de-IL error correction decoding unit 502.

The transmitter performs error correction coding on a transmission data bit string per a long bit length, and then interleaves the resultant information.

Thereafter, the transmitter transmits the resultant information such that even if it includes a burst error, the error is dispersed at the time of error correction decoding. Assume that in the time slot arrangement shown in (A) to (D) of FIG. 3, the period of transmission stop by the transmitter 200 upon detection of a licensed terminal is relatively short, and the unit of interleaving is very large, so that the influence of the transmission stop is low. In this case, error correction can remedy data to some degree even at the occurrence of transmission stop.

In general error correction, likelihood adjustment is often performed in accordance with received power. Although determining a likelihood in accordance with the S/N ratio of a received signal provides better performance, it is not easy to estimate an S/N ratio from a signal. For this reason, in most cases, assuming that most of the noise is thermal noise, received power is used in place of an S/N ratio. When the received power changes due to a natural phenomenon such as fading, a demodulation properly operates on such an assumption. When, however, a receiver receives an interference signal large enough to influence the SINR (signal to interference noise ratio: ratio of signal power to noise power+interference power), the receiver cannot use power in place of an S/N ratio. In an extreme case, even if the receiver receives only interference, it rates the reliability of the symbol high. When the receiver receives only interference, the received data is wrong. If, therefore, the receiver rates the reliability high, the corresponding portion spreads in the entire data by deinterleaving, and hence affects the overall error correction result.

In the second time slot in (A) to (D) of FIG. 3, the receiver 100 of this embodiment receives a mixture of a signal from the transmitter 200 and a signal from the licensed system terminal 250. In the third and fourth time slots, the transmitter 200 receives only interference.

With regard to the signal received in the second time slot, the likelihood changing information generating unit 504 instructs the de-IL error correction decoding unit 502 to rate the likelihood low, upon reception of information indicating that a licensed terminal has started transmission. The portion received in the third and subsequent time slots includes only interference and contains no signal to be received, and hence the likelihood changing information generating unit 504 instructs the de-IL error correction decoding unit 502 not to demodulate the received signal and not to use it for error correction.

When decreasing the likelihood in the second time slot, the receiver may use one of several methods of decreasing the likelihood to a specific degree.

The simplest method is to uniformly determine a specific ratio and decrease the likelihood accordingly. For example, the receiver may use a method of decreasing the reliability of this portion to half that of the remaining portion, or excepting it from evaluation targets without demodulating it as in the third and subsequent time slots.

In order to further improve the performance, the comparison/estimation unit 109 preferably outputs received power and the ratio of interference therein to allow estimation of an S/N ratio (an SINR to be precise) and to change the likelihood in accordance with the estimated SINR.

In addition, as to the received signal in the second time slot, the ratio of interference contained therein varies during the transmission period. In order to perform finer control, therefore, it is desirable to change the likelihood of each symbol.

Note, however, that the comparison/estimation unit 109 does not complete event estimation until it receives at least a signal in the transmission period corresponding to the third time slot. Depending on the timing of error correction for the data including the second time slot, therefore, it is not possible that the system changes the likelihood on time. In many cases, however, interleaving a sufficiently long symbol string allows the system to change a likelihood on time, because it holds long-term data and processes it altogether.

It is therefore preferable to take the form of deinterleaving upon holding data corresponding to the unit of deinterleaving if possible. If the system takes the form of storing received signals upon interleaving them in the order in which they are input, it is preferable to allow information of when and which symbol was received to be referred to later and to allow the de-IL error correction decoding unit 502 to change a likelihood in accordance with likelihood change information even if it is input later.

There is available an arrangement other than that shown in FIG. 5, which is configured not to use a signal received at the time of reception of only interference for error correction. For example, such an arrangement may be configured to be able to shut off an output at any one of the blocks before the de-IL error correction decoding unit 502, e.g., the down converter 103 or the A/D converter 105. In such a case, if only interference is received, no signal is output. That is, since a signal with almost no power is output, even the general arrangement configured to perform likelihood determination on the basis of power at the time of error correction decoding can be made to rate the likelihood low.

Likewise, if the comparison/estimation unit 109 performs determination on time, controlling to decrease output power in accordance with the amount interference superimposed in a block before the de-IL error correction decoding unit 502 makes it possible to use the general arrangement in which the de-IL error correction decoding unit 502 performs likelihood determination on the basis of power.

FIG. 6 shows an example of a frequency usage form for which the arrangement of the communication apparatus of this embodiment is especially effective. Referring to FIG. 6, the horizontal axis and vertical axis represent the time and frequency, respectively, and the rectangles schematically show the frequency/time domains which the transmitter 200 uses. In the case shown in (A) to (D) of FIG. 3, the transmitter 200 uses one frequency band. In the case shown in FIG. 6, the transmitter 200 simultaneously uses a plurality of frequency bands. The portions below the respective frequency bands represent the waveforms of received powers in the respective frequency bands which the receiver 100 of this embodiment has received.

The transmitter 200 uses, for example, three frequency bands having different bandwidths with center frequencies f1, f2, and f3. As in the case shown in (A) to (D) of FIG. 3, the time is divided into time slots, each having a carrier sense period and a transmission period set on both sides of some guard interval. Data is divided into small blocks, and the blocks are transmitted along the arrows in FIG. 6. The portions indicated by the broken lines represent the boundaries between the respective blocks. The boundary intervals vary depending on the frequency bands for the following reason. Since the respective frequency bands have different bandwidths, different times are required to transmission blocks of the same bit lengths. Blocks are concurrently transmitted in a plurality of frequency bands.

Upon detecting transmission from a licensed terminal or an interference wave at an unallowable level in the frequency band of interest during a carrier sense period, the transmitter 200 stops transmission in the succeeding transmission period. In this case, the number of blocks that cannot be transmitted varies depending on the bandwidth. In such a form, even if the transmitter stops transmission, the transmitter stops transmitting only the blocks in the time slot and in the frequency band in which the transmission is stopped, instead of stopping all communication afterward. It depends on the design of the communication system whether to resume transmission in the following time slots in the stopped frequency band, to newly ensure another frequency band, or to continue communication at a reduced communication rate. Even if the communication rate decreases, the situation in which no block can be transmitted due to an abrupt transmission stop can be limited to at least one time slot in the frequency band in which the problem has occurred. In addition, assume that the unit of interleaving includes a sufficient number of blocks. In this case, even if the transmitter abruptly stops transmission, the form shown in FIG. 6 is likely to remedy the transmission by error correction, because only a part of the corresponding blocks are not transmitted/received.

Referring to FIG. 6, a situation similar to that in the case shown in (A) to (D) of FIG. 3 has occurred in f2. Although there is no graphic illustration representing changes in the transmitted power of a licensed terminal, for the sake of space, the licensed system terminal 250 starts transmission in the second time slot. The transmitter 200 then detects the transmission in the carrier sense period in the third time slot, and stops transmission in the succeeding transmission periods.

At this time, of a block A, the portion except for the last portion transmitted in f3 is affected by interference from the licensed terminal which has started transmission at the corresponding timing. Likewise, the portion of a block B which is transmitted in f2, the entire portion of a block C, and the first half portion of a block D have not reached the receiver 100 due to the transmission stop.

Even in such a state, if another portion has reached the receiver at a relatively low error rate, error correction may remedy the transmission. At this time, the error correction decoding performance can be improved by decreasing the likelihoods and reliabilities of blocks in which many errors are estimated to have occurred, like the blocks A, B, C, and D, i.e., portions received in f2 with much interference and portions which have not been transmitted at all, or by stopping demodulation to prevent such portions from being received.

Referring to FIG. 1, the key feature extracting unit 107 extracts a key feature from a signal with a radio frequency before down-conversion. The key feature extracting unit 107 extracts a key feature by detecting the power of a signal received in the frequency band of interest. According to the arrangement shown in FIG. 1, if a frequency band from which a key feature is to be extracted is not selected before input to the key feature extracting unit 107, and the receiver is configured to select a frequency band after the down converter 103, a filter for selecting a target frequency band is placed at the beginning of the key feature extracting unit 107.

When a frequency band is selected, the power of the selected frequency band is detected. This apparatus detects power by, for example, performing rectification, e.g., full-wave rectification or half-wave rectification, for an input signal, and detecting the envelope or averaged value of the signal. When performing envelope detection, the apparatus uses a peak hold circuit and a succeeding smoothing circuit. When performing averaged value detection, the apparatus uses a low-pass filter with a proper time constant.

A key feature may be extracted from other components than a radio-frequency signal. For example, a key feature may be extracted from any one of intermediate-frequency components or from a baseband signal obtained by down-converting the signal. This apparatus can also extract a key feature associated with power even after the signal passes through the VGA 104. In this case, it is necessary to know in advance the adjusted gain of the VGA 104. The form of using the gain-adjusting signal applying to the VGA 10 will be described later with reference to FIG. 9.

In addition, even after A/D conversion, this apparatus can detect power from a portion holding amplitude information including the adjustment amount of the gain adjustment amplifier, i.e., a portion before error correction decoding.

In the form of simultaneously using a plurality of frequency bands as shown in FIG. 6, when the transmitter 200 is to independently stop transmission in each frequency band, it is necessary to detect power for each frequency band. In such a case, this apparatus may separate the respective frequency bands in the key feature extracting unit 107 and detect power for each frequency band. When a frequency-multiplexed signal like that shown in FIG. 6 is received, since the signal is demultiplexed for each frequency band to demodulate each signal at some stage, the form of extracting a key feature by detecting power after demultiplexing is simpler. Even if frequency demultiplexing is to be performed after A/D conversion, it is preferable to perform key feature extraction after frequency band demultiplexing.

A smoothing time constant and the integral time constant of a low-pass filter after peak holding at the time of detection of a received power waveform are determined in the following manner.

For a signal from the transmitter 200 which is received in the frequency band of interest, a time constant with which not much bit change due to modulation remains is selected, i.e., a time constant several times longer than the length of one symbol. With this setting, in some case, the apparatus may detect ramp-up and ramp-down waveforms as those rounded more than the original ramp-up and ramp-down waveforms. In such a case, the waveforms stored in the key feature storage unit 108 are preferably rounded ones which are to be detected with the above time constant.

With regard to transmission from a licensed terminal which uses the frequency band of interest, it is conceivable that the symbol rate of the terminal is equal to or less than that of a cognitive signal, or much lower than that in most cases, in consideration of the fact that a cognitive system is likely to use a wideband including the bands of a plurality of licensed systems. If the symbol rate of the licensed terminal is much lower than that of a cognitive signal, using the same time constant as that used for integration of a signal from the transmitter 200 makes it difficult to smooth a change in power due to modulation. If, however, the main object is to detect a ramp-up waveform, since data modulation is not generally performed at the time of ramp-up, there is no change in power other than ramp-up. Therefore, such a change can be detected. Consequently, comparison with a ramp-up waveform is desirable to be limited to a waveform in a ramp-up period. That is, it is preferable to store only the leading edge portion of the waveform in (B) of FIG. 3 and compare a change in received power with the stored waveform.

Assume that the symbol rate of the licensed system is close to the symbol rate of cognitive transmission in the frequency band of interest. In this case, using an arrangement configured to smooth cognitive modulation will smooth the modulation of the licensed system. At this time, it is likely to also detect the ramp-up waveform of the licensed system as a ramp-up waveform rounded more than the original waveform. In this case, as in the case of cognitive transmission, it is sufficient to store the rounded waveform and compare it with a change in received power.

In this embodiment, several kinds of key features are assumed. The kinds of key features will be described next.

The most intuitive key feature is the temporal waveform change shape of received power itself. That is, the key feature storage unit 108 stores a ramp-up waveform itself at the start of transmission from the licensed terminal as shown in (B) of FIG. 3 for each licensed system in each frequency band. Furthermore, the key feature storage unit 108 stores in advance the shape of change in power when the transmitter 200 stops transmission, as shown in (C) of FIG. 3.

In this case, key feature comparison is performed by checking whether the correlation value between the power received in the frequency band of interest, e.g., the waveform shown in (D) of FIG. 3, and a power temporal waveform change shape corresponding to a stored event falls within a predetermined range.

The correlation is calculated by the following general correlation expression:

$$\int_T^{T+T_0} w_1 w_2^* dt / \sqrt{\int_T^{T+T_0} w_1 w_1^* dt} \sqrt{\int_T^{T_0} w_2 w_2^* dt}$$

where $w_1$ is the waveform of change in received power, $w_2$ is the waveform of change in power corresponding to one of stored events, and * represents phase conjugation. If the phase of w means nothing, w*=w. This apparatus calculates a correlation in the interval between time T and time $T_0$. If the waveforms of change in power completely match each other except for absolute amplitude value, the correlation is 1.

In key feature comparison, this apparatus detects the occurrence of a significant change in received power, and is triggered by the detection to start comparing the detected change with a stored power change waveform. It is conceivable to use several methods concerning triggers for the start of comparison.

One of the methods is detecting that it is estimated to have received a signal with different power shape from the waveform to be received when transmission is properly performed in the frequency band of interest, and using it as a trigger, the apparatus starts comparing the received shape with a shape stored as an event.

For this purpose, the receiver knows an ideal received power waveform received when transmission is properly performed, and holds it in some storage area. The storage area for holding the waveform may be the key feature storage unit 108, or may be provided separately. The waveform is, for example, the waveform shown in the frequency band f1 in FIG. 6. The receiver calculates the correlation between the stored waveform and the received waveform. If the receiver performs normal reception, time slot synchronization should have been established. The receiver therefore knows at which timing it should take the correlation, and hence takes the correlation in accordance with the timing of a time slot.

Obviously, at the stage where no synchronization is established at the beginning of receiving operation, this apparatus detects a timing corresponding to the maximum correlation by shifting a stored waveform in the time direction. Subsequently, the apparatus synchronizes a time slot, and fixes the corresponding timing. It is desirable that no problem occurs in transmission at least until first synchronization is established. If a problem occurs, synchronization cannot be properly established, resulting in detection of a transmission stop.

In a case wherein time slot synchronization is established in a plurality of frequency bands as shown in FIG. 6, there is no need to measure each timing to establish the correlation synchronization for each frequency band. That is, when synchronization is established in any one of the frequency bands, the apparatus can apply the timing to the remaining frequency bands. In this case, a difference in the time constant of a filter for extracting a frequency band or a skew may cause a slight timing shift. When such a situation is expected, each timing for each frequency band may be taken. However, the difference of the time constant of the filter or the skew can be known in advance, it is sufficient to use the timing shifted according to the differences.

Received power generally contains thermal noise and electro-magnetic noise radiated by an electronic device such as a personal computer. In addition, ripples occur in the power due to modulation corresponding to the information contained in the received power depending on the relationship between an integral time constant at the time of reception of the power, a smoothing time constant for a peak-hold output, and a symbol rate. For this reason, in many cases, in a state wherein power can be received to a certain degree, the corresponding correlation value becomes close to 1 but does not completely become 1. The amount by which the correlation value is reduced by ripples due to modulation can be known from a modulation scheme, a symbol rate, and various kinds of time constants, without measurement. Obviously, it is assumed that the receiver knows the symbol rate and the modulation scheme at and by which the transmitter 200 transmits signals in the frequency band of interest, and also knows the symbol rate and the modulation scheme which the licensed system in the frequency band uses. The licensed system may support a plurality of modulation schemes and symbol rates. In such a case, the respective schemes may be regarded as different systems, and comparison may be performed for each system. Therefore, it is preferable to know in advance to which degree the correlation value in each case decreases.

However, the ratio of thermal noise and electro-magnetic noise due to PCs (Personal Computers) to received signal power changes depending on the location of the receiver, the distance between the receiver and the transmitter 200, a fading state, and the like. Therefore, the corresponding correlation reducing value varies in accordance with the time and situation. This makes it difficult to uniformly determine an exact correlation value.

First of all, the receiver takes the correlation between received power and a stored waveform in the frequency band of interest in a predetermined period, e.g., a period in which the receiver obtains a timing for taking the first correlation, and detects the resultant value. At this time, if the correlation value is considerably smaller than 1 so that the transmitter 200 seems to have stopped transmission, the receiver determines a transmission stop. In most cases, such a situation does not occur, and a correlation value reasonably close to 1 can be obtained.

The key feature storage unit 108 stores the value obtained by the measurement in the predetermined period as a reference value. Note that the reference value may be simply the averaged value of correlation values in a predetermined period or the value calculated by performing filter-like processing so as to rate the ratio of a correlation value near to the current time high and rate the ratio of a correlation value at far past low.

Subsequently, the receiver keeps on acquiring correlation values by continuously taking correlations. Upon acquiring a correlation corresponding to unit waveform, e.g., one peak or one period in the waveform shown on the lower side of f1 in FIG. 6, the receiver compares the acquired value with a reference value. Alternatively, the receiver may perform measurement in a plurality of peaks as one unit instead of one peak and compare the measured value with the reference value. As shown in FIG. 6, in handling a repetitive waveform, the unit of correlation value acquisition is preferably an integer multiple of the time slot period so as to prevent a temporary shift in a correlation value. Since the purpose of such operation is to detect a transmission stop, it is sufficient that the key feature storage unit 108 stores in advance correlation values corresponding to a total of two periods, i.e., one period before a transmission stop and one period after the transmission stop. In this case, the key feature storage unit 108 stores for a while the power waveform measured in one unit time in accordance with a situation.

If the comparison result obtained by the comparison/estimation unit 109 indicates that the newly acquired correlation value falls within a predetermined tolerance with respect to the reference value, the receiver determines that no significant change has occurred in the power waveform, and continues measurement. If the newly acquired correlation value falls outside the tolerance, it is conceivable that some change has occurred. A case wherein a change has occurred will be described later.

If no significant change has occurred, the newly acquired correlation value is reflected in part of the reference value. If the reference value is the averaged value of correlation values in a predetermined period, the receiver newly calculates an averaged value by replacing the oldest value corresponding to the measurement period equal to the measurement period of the newly acquired correlation value with the newly acquired correlation value. If a reference value has been obtained by filter-like processing, it is sufficient to input the new correlation value in the corresponding filter function and properly process the value.

Always updating the reference value in this manner makes it possible to remove a slow change like a change in received power accompanying, for example, fading, shadowing, or the movement of the terminal, and detect only an abrupt power change due to an intentional behavior. It is therefore better not to take a very long period or time constant for averaging or filtering of reference values. Such a period or time constant should be set so short as to prevent at least a correlation value variation caused by fading from falling outside an tolerance or from occupying most of the tolerance upon comparison with the reference value.

Note that it is preferable to correct the timing of taking a new correlation, as needed, using a signal from the block of establishing the slot timing for reception and acquire a correlation at a possibly correct timing so as to prevent the occurrence of a correlation value reduction due to a acquisition timing shift. The tolerance of correlation values has its lower limit at a value smaller than the reference value by a predetermined ratio. The cause that the receiver can received signals fairly well but the correlation value does not become 1 often resides in the power of noise. In order to check how much the power waveform of the transmission signal from which the power of noise is removed has changed, whether the change rate of the power waveform falls within a predetermined ratio is desired to be detected, and therefore the lower limit with a predetermined ratio is decided as the tolerance.

It is preferable to set a predetermined ratio so as to satisfy, for example, next conditions. A condition that a correlation value does not fall outside the tolerance due to a slight influence of fading, a condition that a correlation value does not fall outside the tolerance due to a slight variation in noise, a condition that a correlation value falls outside the tolerance when the receiver receives a signal with sufficient power to be detected, i.e., the receiver receives a transmission start waveform from a licensed terminal which is at a nearby place, and a condition that a correlation value falls outside the tolerance when the cognitive transmitter 200 stops transmission.

When the receiver keeps taking correlations in this manner, a correlation falls outside the tolerance due to some phenomenon. At this time, since the key feature storage unit 108 stores the waveform until the receiver finishes taking a correlation corresponding to one unit, as described above, the comparison/estimation unit 109 compares the waveform, or the waveform obtained by connecting the subsequent waveform in some case, with a waveform corresponding to a specific event stored in the key feature storage unit 108.

Assume that the receiver has received a waveform like that shown in (D) of FIG. 3. In this case, the receiver takes a correlation with a waveform corresponding to an event that can occur in the frequency band of interest, more specifically, a transmission start by a licensed terminal in the frequency band, a transmission stop by the cognitive transmitter 200, a transmission start by another unlicensed terminal to be described later, or the like.

(C) of FIG. 3 shows an example of the waveform at a transmission stop by the transmitter 200. In this case, the receiver takes a correlation with a received power change waveform at a proper timing as in the case wherein the receiver takes a correlation to check proper operation. However, the receiver cannot take any timing when no power is detected. For this reason, the receiver establishes a proper timing at least when power is detected, and applies the established timing to subsequent operation. If the receiver simultaneously receives power from a licensed terminal as shown in (D) of FIG. 3, the detected correlation value does not become 1. If, however, the transmitter 200 stops transmission upon detecting transmission from a licensed terminal located on the opposite side to the receiver, and the transmission from the licensed terminal does not reach the receiver, the correlation value becomes close to 1. Whether there is a significant correlation is determined by checking whether the correlation value is equal to or more than a predetermined value. However, since another power, e.g., transmitted power from a licensed terminal, may simultaneously exist as shown in (D) of FIG. 3, the threshold is set to be relatively low at the time of event detection. In addition, the threshold is set to be high enough not to detect a change like a slight change due to fading or the like.

(B) of FIG. 3 shows an example of the transmission start waveform of a licensed terminal. Since this waveform is not a periodic waveform, it is difficult to establish a proper timing for detection. For this reason, one waveform is temporally shifted little by little around the occurrence of a change to take a plurality of correlation values, and the largest value is used. In this case as well, whether an event has occurred is determined by checking whether the correlation value is equal to or more than a threshold. In addition, when the transmitted power of the licensed terminal is low, or even if the licensed terminal has transmitted with sufficient power, the power may be much lower than the power at the time of reception of a transmission from the cognitive transmitter, depending on the frequency ratio occupying the frequency band. It is therefore preferable to know in advance for each licensed terminal how much power the receiver should receive to provide some meaning, and to determine the lower limit of correlation values in correspondence with the power. The lower limit value also changes depending on the ratio of received power from the licensed terminal to received power from the cognitive transmitter.

If transmission from the licensed terminal has time slots as in the case of the cognitive transmission in (A) to (D) of FIG. 3, and the terminal performs periodically transmission at a relatively short period, it is preferable to detect the period, as well as a ramp-up waveform, in the same manner as the detection of a cognitive transmission.

As another method of obtaining a trigger for the start of event detection, the receiver may use a method of continuing to take the correlation between a received power waveform and a waveform like the transmission stop waveform of a transmitter or the transmission start waveform of a licensed terminal, without detecting any distinct trigger in particular, and determining the occurrence of an event upon taking a correlation equal to or more than a predetermined value. With regard to a waveform partially having a period like a transmission stop waveform, the receiver keeps taking a correlation at one-period intervals upon the established timing. Since the transmission start waveform of the licensed terminal has no period, the receiver keeps taking a correlation at short time intervals.

Such time intervals are made to correspond to the quickness of change of the transmission start waveform stored in the key feature storage unit 108. That is, the intervals are shortened to such an extent that when the timing shifts by one interval away from the optimum interval, the resultant correlation value does not decrease considerably. It is preferable to set intervals shorter than a time corresponding to the reciprocal of the maximum frequency of the ramp-up waveform, e.g., a frequency at 10-dB down from the peak frequency.

When correlations equal to or higher than the predetermined value has been obtained with either waveform, the receiver outputs information indicating the detection of the event from the comparison/estimation unit 109. In most cases, a signal from the cognitive transmitter is stronger than a signal from the licensed terminal, and hence it is easier to detect the stop of transmission from the cognitive transmitter. Therefore, the start of transmission from the licensed terminal is not detected at a high possibility because of the insufficient received power. Even in this case, since the receiver can detect the stop of transmission from the cognitive transmitter, an object of the present invention, i.e., to detect an artificial change, can be achieved.

Assume that this apparatus cannot detect any transmission from the licensed terminal at a portion overlapping a transmission from the cognitive transmitter. Even in this case, if the cognitive transmitter is located close enough to the licensed terminal to stop transmission, and the licensed terminal performs transmission, the apparatus can detect the transmission at least in a period like a carrier sense period, and the transmitter can stop transmission. Even if the apparatus cannot receive a minute change that overlaps received data, there is not much disadvantage in terms of operation.

Detecting both events can improve the reliability of determination in the cognitive transmitter and receiver. Therefore, it is preferable to detect both events. For example, in some case, the received power of a radio wave from the licensed terminal is almost equal to the received power of a radio wave from the cognitive transmitter, and a transmission stop cannot be detected. For example, this includes the case shown in (D) of FIG. 3 that the constant received power level from the licensed terminal is equal to the constant received power level from the cognitive transmitter before the transmission start event of the licensed terminal. Detecting both events makes it possible to detect a ramp-up waveform from the licensed terminal even in such case, and hence to detect a transmission stop.

Note that in the carrier sense period in (A) to (D) of FIG. 3, the receiver of this embodiment sometimes cannot perform a receiving operation in the frequency band of interest. More specifically, such a situation occurs in a case wherein FDD (Frequency Division Duplex) is applied and the receiver is used for carrier sensing in another frequency band for transmission in the next transmission period. In such a case, power detection in a reception frequency band cannot be performed in a carrier sense period and partial periods which are required to switch frequencies before and after the carrier sense period. In this case, for example, in the case shown in (D) of FIG. 3, since the detected signal does not contain radio wave in carrier sense periods and it is preferable to except the corresponding portion from the subsequent processing targets.

When an entire ramp-up period of a licensed system is unfortunately included in a carrier sense period, the start of transmission from the licensed system may not be detected, depending on the kind of key feature. However, the communication apparatus of this embodiment comprehensively determines a transmission start on the basis of a combination of a plurality of events, and hence can detect at least the stop of transmission from the transmitter. This makes it possible to perform subsequent operation to some degree.

(Comparison Based on Derivative)

In addition to the method of detecting events using waveform shape itself regarding as a key feature, this embodiment can use several kinds of key features and comparison methods. These methods include a method of using the derivative of a received power waveform. In this case, the key feature extracting unit 107 detects a power waveform as in the case of using a waveform itself, and then differentiates the waveform. Upon detecting a significantly large derivative in a portion other than a portion at which a power change is expected when a receiving operation is properly performed, this apparatus determines that some event has occurred.

Figure 7:
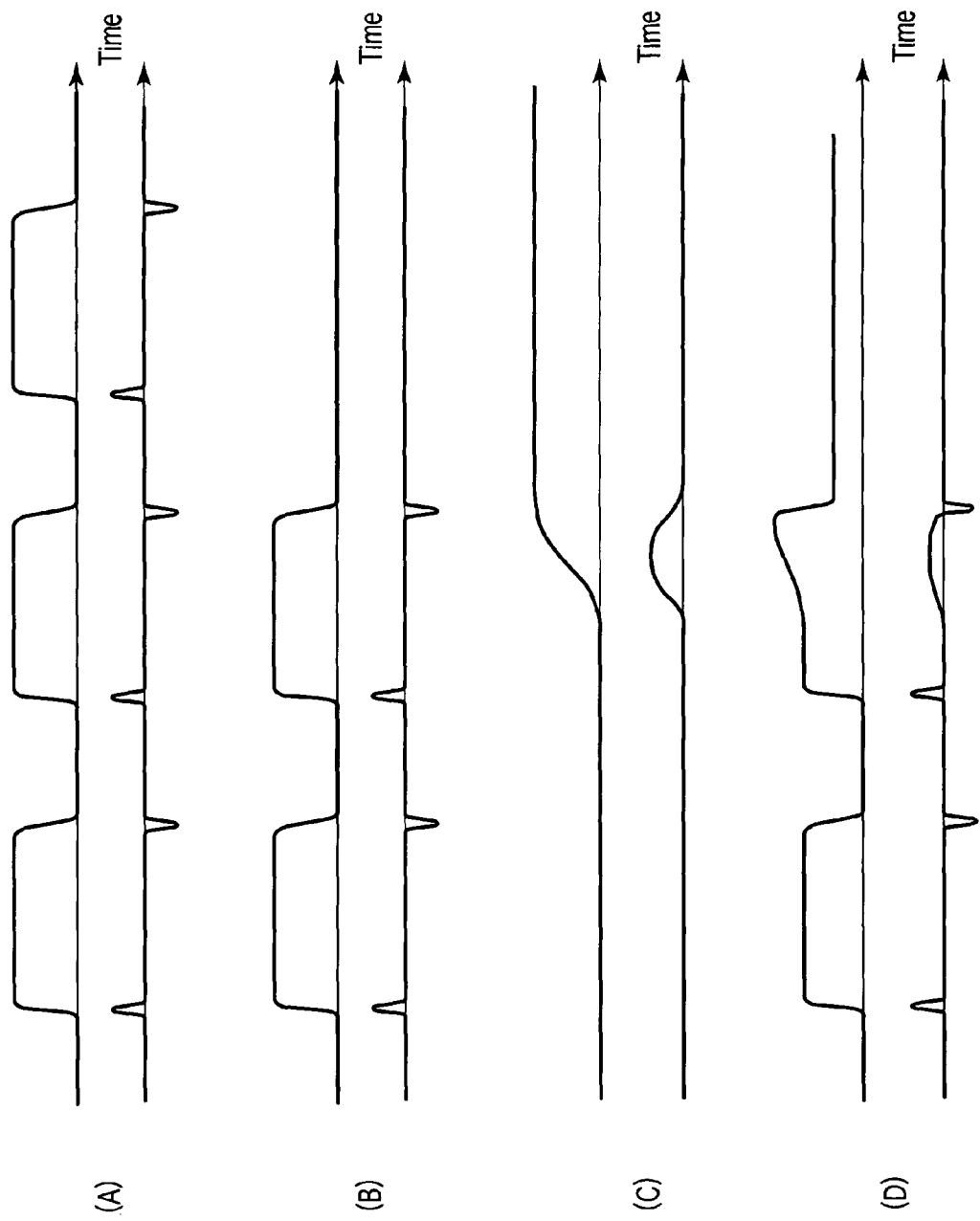
FIG. 7 is a view for explaining an example of the operation of the communication apparatus of this embodiment when a derivative is used as a key feature.

For example, derivatives appear as shown in (A) to (D) of FIG. 7. (A) of FIG. 7 shows a case wherein this apparatus normally performs reception in the frequency band of interest. The upper side of (A) of FIG. 7 shows the waveform of a detected power. The lower side of (A) of FIG. 7 shows the values obtained by differentiating the waveform. The obtained values are almost 0 except that impulse-like derivatives appear at the leading and trailing edges. When the signal-to-noise ratio of a received signal is low, noise causes slight changes in received power, which is reflected in derivatives. In most cases, however, these values are small, and hence setting a threshold for determining whether an event has occurred makes it possible to solve this problem. As shown in (A) of FIG. 7, derivatives appear on the positive and negative sides. Since positive and negative derivatives represent different characteristics of changes which have occurred in the received power, it is preferable to keep their signs and perform determination by respectively providing thresholds for the positive and negative values. Note that when the apparatus detects received power before normalization (conversion into a uniform amplitude), and thermal noise is dominant, a constant threshold is set regardless of the averaged value of received power. If, however, the influence of interference noise due to a PC is strong, the apparatus may have a function of adjusting a threshold depending on the time or the movement of a place. More specifically, for example, at the start of reception or when some changes are observed, the apparatus determines a threshold that can eliminate the influence of noise by observing for a while. As in the case of correlation, the apparatus may also determine a threshold from a period in which noise is dominant in a preceding predetermined period. That is, a threshold value is determined by adding a slight margin to the maximum derivative or an average $+3\sigma$ ($\sigma$ is the standard deviation of variations in detected value) in a period except for a period in which a large derivative is expected when proper reception is performed. Obviously, when determining a threshold, the apparatus performs calculation upon excluding a portion in which some event has been detected (this applies to the case of correlation).

As in the case of taking a waveform correlation, it is checked whether the apparatus is normally operating in a usual condition. That is, it is checked whether a positive derivative coefficient close to a predicted value is detected at the beginning of a transmission period and a negative derivative coefficient close to another predicted value is detected at the end of the transmission period. The apparatus determines each predicted value from, for example, the average of values in several preceding periods as in the case of waveform correlation. With regard to a value exceeding the threshold, a normal receiving state is a state wherein only these values are detected.

When some event has occurred, i.e., when the licensed terminal has started transmission as shown in (C) of FIG. 7 and the transmitter has stopped transmission in the succeeding transmission period upon detecting the transmission from the licensed terminal as shown in (B) of FIG. 7, the derivatives of the received power appear as shown in (D) of FIG. 7. As a result, the state shown in (A) of FIG. 7 cannot be maintained.

Before and after the licensed terminal has started transmission, relatively small positive derivatives corresponding to the ramp-up waveform are continuously detected. A negative derivative corresponding to the trailing edge of a signal from the cognitive transmitter is then detected near the above described derivative. After this detection, a positive derivative corresponding to a leading edge should be detected but is not detected. Since a positive derivative coefficient is detected at a timing at which such coefficient should not be detected, the comparison/estimation unit 109 can detect that something other than the cognitive transmitter has started transmission. The key feature storage unit 108 stores in advance a period of derivatives corresponding to the ramp-up waveform of the licensed system using the frequency band of interest and the minimum amount (corresponding to a threshold) of derivatives generated by a radio wave when the receiver is located within the reach from the licensed system. Likewise, the key feature storage unit 108 stores information indicating that when the cognitive transmitter has stopped transmission no leading edge is detected after a trailing edge. If a derivative exceeding a positive/negative threshold is observed or a value which should be obtained at the time of normal reception is not observed, the comparison/estimation unit 109 compares the corresponding pattern with the contents of the key feature storage unit 108, estimates what has occurred, and outputs the corresponding information. That is, the comparison/estimation unit 109 determines whether a derivative coincides with a derivative stored in the key feature storage unit 108 in positive/negative sign and is larger than the stored value.

Note that the manner of establishing a timing for a transmission period is the same as that for a waveform correlation.

When derivation is used in this manner, detection is basically performed on the basis of the magnitudes of values, and therefore, the manners of performing integration and determining a time constant for smoothing at power detection demand a much attention. If the integration is not sufficient, a power change due to modulation remains. This produces unnecessary derivative, resulting in an unnecessary detection of power change. If the detection threshold is increased to prevent this, a necessary power change might not be detected.

It is therefore necessary to perform sufficient integration so as to prevent any modulation component from remaining regarding to at least cognitive transmission. In this case, a ramp-up waveform may be rounded. However, as in the case of waveform correlation, it is sufficient to store a ramp-up waveform in a rounded state. On the other hand, with regard to transmission from the licensed terminal, this apparatus stores derivatives corresponding a ramp-up waveform in advance, in order to detect the transmission if it is present. It is sufficient even if various derivatives are generated from modulation components that have not been smoothed by integration. This is because although a communication system may not be estimated, storing such values makes it possible to detect the occurrence of some abnormality. In such a state, the apparatus detects a derivative periodically varying corresponding to the symbol rate. Storing the symbol rate of the licensed system of the frequency in the key feature storage unit 108 makes it possible to estimate the licensed system from the period.

(Average Received Power Value)

(A) to (D) of FIG. 7 show the case wherein fast changes are captured by derivatives. However, valued obtained from slower power detection and differentiation can be used as key features. This operation will be described with reference to (A) to (E) of FIG. 8.

Figure 8:
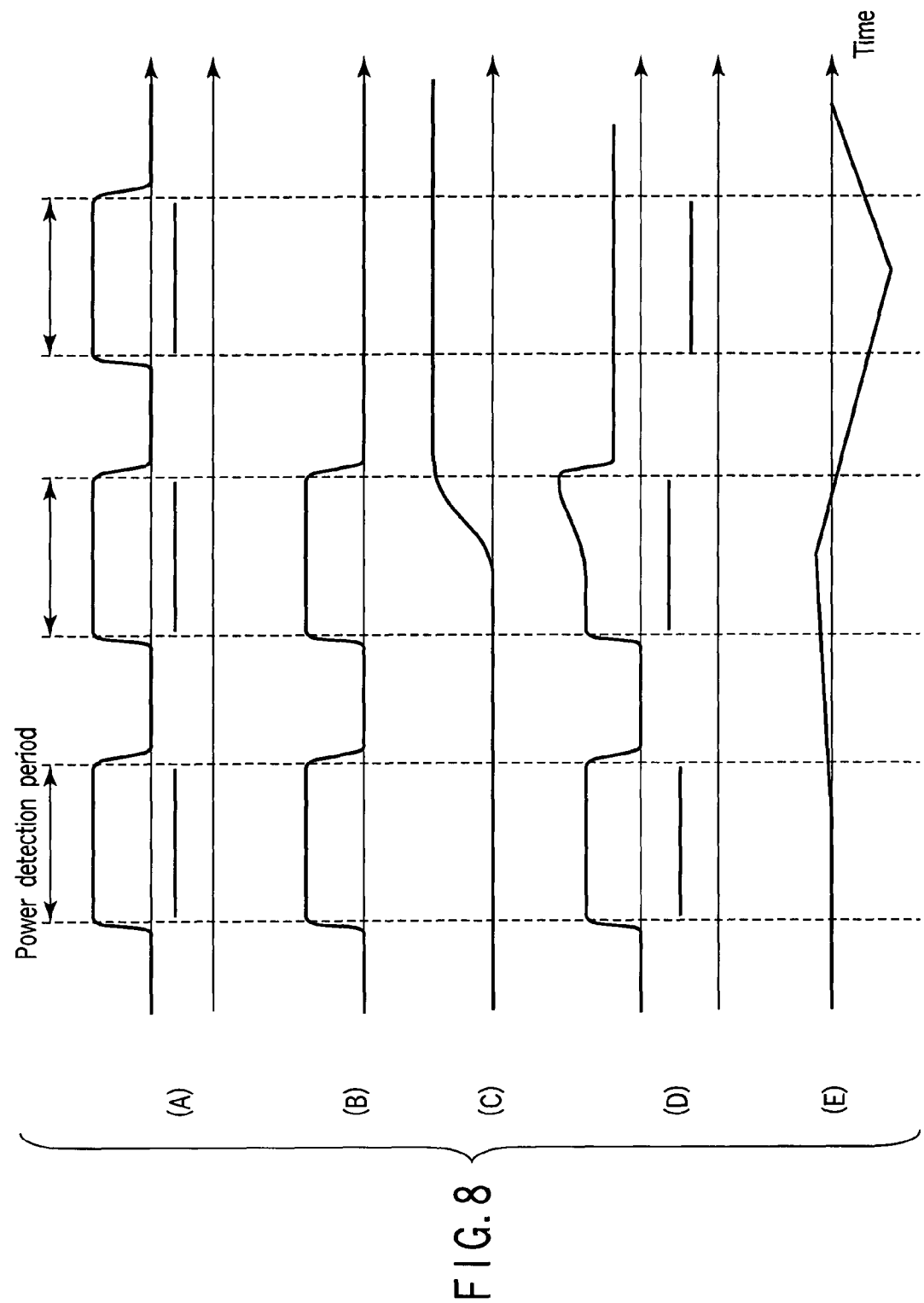
FIG. 8 is a view for explaining an example of the operation of the communication apparatus of this embodiment when an average received power value is used as a key feature.

Like (A) of FIG. 7, the upper side of (A) of FIG. 8 shows a received power waveform when the power is normally received. The lower side of (A) of FIG. 8 shows a case wherein the apparatus detects powers only per transmission periods and outputs the averaged values of the powers. Each value indicated on the lower side of (A) of FIG. 8 is an averaged value in a corresponding power detection period, and hence has a constant value, i.e., one value in a period.

A receiver 500 differentiates the averaged values detected in adjacent power detection periods. This is discrete processing, and in practice, therefore, the receiver calculates the difference between the averaged values. When the receiver calculates the difference between the values in the respective periods in the state shown in (A) of FIG. 8, since the transmission is normally received, there is almost no power difference between the periods. That is, the difference value is normally about 0 (not shown).

At this time, as shown in (C) of FIG. 8, the licensed terminal starts transmission. When the transmitter then detects this and stops transmission in the succeeding transmission period as shown in (B) of FIG. 8, the receiver detects power as shown in (D) of FIG. 8. That is, in the second transmission period in which the transmission from the licensed terminal overlaps the cognitive transmission, the averaged value of detected power increases. In the third transmission period in which the cognitive transmitter has stopped transmission, the averaged value of power decreases. (E) of FIG. 8 shows a case wherein the difference from the preceding time slot is calculated. This difference slightly increases in the second transmission period and greatly decreases in the third transmission period.

The receiver sets a threshold for removing variations due to noise when determining an increase/decrease in difference as in the case shown in (A) to (D) of FIG. 7. In addition, the threshold is preferably set to a value large enough to remove the influence of fading. Since fading is slow, even if it causes fluctuations in the received power of cognitive transmission, the difference value is very small.

When detecting a positive difference value exceeding the threshold in the second transmission period, the receiver can detect that a communication system other than the self system has started transmission. Furthermore, when detecting a negative difference value exceeding the threshold in the next transmission period, the receiver can detect that the self system or the communication system which performed transmission in the preceding period has stopped transmission. In this case, notified of not only the derivative but also the averaged value on the lower side of (D) of FIG. 8, these can be detected that the power which should be received has not been received at proper timing in the third transmission period and that the self system has stopped transmission.

The key feature storage unit 108 stores in advance information indicating that when a positive difference equal to or more than a predetermined value is detected, another system has started transmission, and information indicating that when a negative difference equal to or more than a predetermined value is detected, the self system or another system has stopped transmission, depending on the shape of change in averaged value indicating which system has stopped transmission.

Note that since power detection is performed upon averaging, its period may be prolonged and include ramp-up and ramp-down portions. Moreover, average power in an entire time slot including a carrier sense period can be used.

According to this embodiment, in a communication system designed to control transmission power, since power increases/decreases for each time slot, this increase/decrease may be erroneously detected. Such a communication system preferably performs evaluation after removing the influence of a power change by receiving information concerning it from the transmitter.

It is possible to perform detection for each time slot as shown in (A) to (E) of FIG. 8 by using a control signal to the VGA. This operation will be described with reference to FIG. 9. As described above, the VGA performs adjustment to make a signal input to the A/D converter 105 fall within a predetermined range. A baseband processing unit 902 generates a control signal to be input to a VGA 901. Alternatively, a separately provided analog VGA control signal generating function may generate this control signal at the stage before the baseband processing unit 902. If the power has slightly increased in the preceding time slot, the VGA decreases the gain to make a signal fall within the input range of the A/D converter 105. If the power has slightly decreased, the VGA increases the gain to prevent an increase in quantization noise as the signal level unacceptably decreases.

When power detection is performed before the VGA, true received power can be detected. When, however, power detection is performed after the VGA, the detection result is only that of the power having undergone gain adjustment by the VGA. In the latter case, a method of generating a control signal to the VGA can be such that holding past control information and adjusting the voltage or current to the main circuit of the VGA by increasing/decreasing the control information. A key feature extraction unit 903 acquires from the VGA 901 the voltage value or current value to be applied to the VGA and extracts average received power. In this case, the control signal itself that is externally input to the VGA, indicates only an increase/decrease, but does not allow to estimate any power therefrom. However, the voltage or current applied/supplied to the main circuit of VGA corresponds to received power, and hence power information can be acquired from there or it can be reconstructed by combining held past information with the increase/decrease.

Although the VGA 901 may be placed before the mixer in the down converter as well as before the A/D converter 105, it does not matter whether the VGA uses any one of control signals or uses them together, as long as average received power corresponding to one slot can be detected.

If a control signal to the VGA 901 is designed to exactly maintain the output power constant, the VGA 901 can use the signal without any change. If, however, such a signal is designed to control output power within a predetermined range, also received power information detected in the process of generating the control signal is used.

(Utilization of Key Feature of Transmission from Unlicensed System)

The receiver of this embodiment may have the knowledge of not only transmissions from the self system and a licensed system as key features but also key features of transmissions from unlicensed systems which may use the same frequency band, and use them upon comparison/estimation. Such transmissions include, for example, transmissions from cognitive systems with different specifications or from UWB system. The receiver uses the same key feature extraction method and comparison/estimation method as those described above. There are several points to be noted when discriminating transmissions from these unlicensed systems from those from licensed systems and the self system.

UWB is a technology using a very wide band. This embodiment detects power in each frequency band received by the receiver. In the case of UWB, signals are generally transmitted with a bandwidth occupying whole band. Because of this very wide band, both ramp-up and ramp-down occur quickly. When such ramp-up and ramp-down components are extracted with the bandwidth of the frequency band, the ramp-up or ramp-down wave form are likely to exhibit a speed equal to or higher than that of the transmitter of the communication system of this embodiment. Most licensed systems use narrow bands, and use only part of the frequency band which the transmitter and receiver of this embodiment use. Therefore, slow ramp-up and ramp-down occur in such licensed systems. Therefore, upon detecting ramp-up/ramp-down equal to or faster than that from the transmitter of the embodiment at a timing other than the timing corresponding to a time slot transmitted from the transmitter of the embodiment, the receiver can determine that the detected ramp-up/ramp-down is from an unlicensed system using a wideband such as UWB.

In a communication system using a plurality of frequency bands as shown in FIG. 6, comparing changes detected at the respective frequencies makes it possible to discriminate UWB. Since UWB is a very wide band, a power change like that in the frequency band f2 may simultaneously occur at least in a plurality of, might not in all of, frequency bands.

The comparison/estimation unit 109 of the receiver of this embodiment has a function of comparing key features detected in a plurality of frequency bands at a proper timing. Upon detecting very fast power changes almost simultaneously in a plurality of frequency bands, the receiver can determine that this occurs because UWB or a PC has approached the receiver but not because the licensed system has started transmission.

The expression "almost simultaneously" is used because frequency hopping may be performed at very high speed depending on the type of UWB system, and different hopping bands in UWB band lead to slight shifts of detection timings. If, however, the hopping intervals are sufficiently shorter than the transmission period of the transmitter of this embodiment, timing shifts can be regarded as almost simultaneous. In addition, a periodic transmission pattern based on frequency hopping is detected in a very short period. If, therefore, this apparatus uses a key feature that allows detection of such a period, the apparatus can specify a communication system by storing the pattern in the key feature storage unit 108 in advance and comparing it with a detection result.

As described above, if the transmission pattern of an unlicensed system is known, having the knowledge of, in advance, information such as ramp-up and ramp-down waveforms, a frequency usage method, and a frequency hopping pattern and storing them in the key feature storage unit 108 in advance make it possible to specify a communication system as an unlicensed system. Assume that a given communication system is determined as an unlicensed system. In this case, if there is no influence on reception, notifying the transmitter of information which prompts it to keep using the frequency through a control channel makes it possible to prevent a decrease in the number of available frequencies.

The receiver sometimes detects a pattern generated by, for example, noise at static electrical spark or noise from a PC. They are wideband patterns, but cannot be classified to any specific pattern, and hence cannot be specified as a licensed system, unlicensed system, or self system. In this case, it is preferable to notify the transmitter of information indicating that the detected pattern could not be specified and, if possible, a detected key feature. This is because even if the detected key feature does not match any specific key feature, there is a possibility that the key feature can be judged to be that of a PC noise by statistical characteristics, e.g., a characteristic that line spectra are observed in periodic frequencies.

If a transmitter is performing transmission to a plurality of receivers and receivers except for a specific receiver have not detected the pattern, it is possible to identify the pattern as a very short-range radio transmission or noise. Most systems which perform short-range radio communications using widebands like a cognitive system are likely to be unlicensed systems, and hence it is possible that the transmitter can determine that it can continue transmission.

(Shadowing)

In addition, the function of simultaneously detecting a plurality of frequency bands can be used to discriminate shadowing, detect its parameter, and correct the power detecting operation of this embodiment. Although shadowing is slow, since it simultaneously occurs at almost all frequencies in similar temporal waveform change shapes, shadowing can be discriminated by this characteristic.

In this case, the comparison/estimation unit 109 is configured to detect a very slow change, i.e., a slow change throughout several ten, several hundred, or more time slots. For this purpose, past power detection results, key feature extraction results, or past key feature reference values can be stored in the key feature storage unit 108 in chronological order for a predetermined period of time. In this case, it is preferable to remove values obtained at the time of detection of abnormality and events. This apparatus uses only values stored upon normal reception to detect a long-term change.

This apparatus detects a long-term change shape from these pieces of information. According to the event detection function, a long-term change due to shadowing or fading is equal to or less than a threshold and is not identified as any kind of event. The apparatus detects a slow temporal change shape by arranging these key features in chronological order. When the changes of different frequency bands are compared with each other and it is found that they decrease or increase in similar tendencies throughout almost all reception frequency bands, the change can be determined as shadowing.

If, however, the distribution of frequency bands to be used is very wide, the width by which power decreases due to shadowing is small on the low-frequency side and large on the high-frequency side. If the used frequency is very wide, the apparatus can also determine from such a characteristic that the change is shadowing.

In addition, using the same method allows to detect a slow change in received power due to the movement of the transmitter or receiver as a phenomenon which can be handled in almost the same manner as for shadowing. A correction method for shadowing and terminal movement is the same as that associated with fading, and hence will be described in a portion concerning the correction method for fading.

(Fading)

In a communication system using a wideband assumed in this embodiment or a plurality of frequency bands, in most cases, fading is a frequency-selective fading, and has no correlation among a plurality of frequency bands. Therefore, this embodiment performs determination for each frequency band. Except for this point, the detection method is the same as that for shadowing. That is, this apparatus stores key feature detection results in a relatively long predetermined period from a given point of time to a given point of time in the past. The key feature storage unit 108 preferably stores such detection results of a plurality of time slots corresponding to a length of about 100 ms because fading occurs during several tens of ms or several sec/several tens of sec. In this case, the key feature storage unit 108 excludes key features obtained when it is determined that some events, e.g., abrupt changes, have occurred.

Note that since the range of fading speeds can be roughly determined from a propagation model for the cognitive system, the length of a period for which detection is performed may be determined on the basis of the range.

In addition, when key features take positive and negative values in a short period as in the case wherein short-term derivative are used as key features, changes in the absolute values of key features can be used.

The comparison/estimation unit 109 then determines whether the result obtained by arranging the key features indicates a temporally constant tendency. The comparison/estimation unit 109 determines whether the result indicates a change in a predetermined direction, i.e., a monotonic increase/decrease in received power, for a period of about 10 ms, although it is not necessary to be detected throughout all the values stored. Note that, as described above, if an increase/decrease in received power has occurred due to power control from the transmitter, the receiver knows this, and it is preferable to correct such changes in advance.

In many cases, changes in key feature and received power include some variations. Even a monotonic increase in a long term may show slight short-term decreases due to variations, if the monotonic increasing rate is low. Since it should not be judged from such values that a change is not a monotonic increase, it is preferable to perform determination upon smoothing of variations. Using reference values obtained by averaging during the predetermined number of time slots or low-pass filtered values instead of power or key features themselves makes it unnecessary to perform smoothing, because such values have already been smoothed.

When a monotonic decrease or monotonic increase is detected for some period of time, it can be determined that a phenomenon such as fading, shadowing, or the movement of a terminal has occurred. In addition, comparing a plurality of frequency bands makes it possible to discriminate fading and shadowing/movement. If there is no correlation between change tendencies in a plurality of frequency bands, it can be determined that fading has occurred.

(Correction of Shadowing/Fading)

A method of correcting shadowing or fading detected in this manner will be described next. The comparison/estimation unit 109 performs this correction. Note that as described above, since a threshold for event detection is set sufficiently large so as not to erroneously detect fading or shadowing as a event, it is not always necessary to perform correction for a slow change due to shadowing or fading. However, performing correction can, for example, decrease the detection threshold and improve the detection sensitivity.

When a monotonic increase or decrease in key feature which seems to be caused by shadowing or fading is observed, this apparatus calculates, first of all, the rate of the change, i.e., derivative coefficients. Even in the case of a monotonic change, the derivative coefficients are rarely constant. As described above, even if variations are suppressed by smoothing or the like, slow changes remain, and hence the derivative coefficients do not become constant. This is a change due to fading or the like which should be detected by detection. This apparatus uses the most recently calculated derivative coefficient. This makes it possible to perform correction depending on the direction and amount of change occurring at this point of time.

Upon determining a derivative coefficient for correction, this apparatus calculates a predicted change by multiplying the derivative coefficient by the time from the preceding key feature detection to the current detection. The apparatus then subtracts the calculated predicted change from the key feature detected in the corresponding time slot or the corresponding point of time. If a key feature evaluation is being performed with absolute value, subtraction is performed in the direction to decrease the absolute value. As a consequence, the key feature is corrected, and comparison/estimation processing such as correlation processing and threshold determination processing is performed for the corrected key feature by the same method as that described above.

In the case of fading, such processing is performed for each frequency band. In the case of shadowing or the movement of a terminal, such processing may also be performed for each frequency band. If, however, the frequency range is relatively narrow and a key feature increases/decreases in almost the same manner during reception throughout all the frequency bands, a derivative coefficient detected in one frequency band, e.g., a frequency band near the center of the frequency range, may be applied to the remaining frequency bands. In this case, received power may be different for the respective frequency bands. Such cases include, for example, a case wherein a transmission spectrum density per 1 Hz is constant, and the respective frequency bands have different bandwidths. In this manner, when received power varies due the specification of a system, the receiver knows the differences of powers, and therefore, the receiver can use the coefficient corrected in accordance with the known ratio of power.

Even in the case of shadowing or movement, when the frequency range is wide, one derivative coefficient may not be sufficient. In such a case, it is sufficient to use a method of detecting derivative coefficients in more than one frequency band and performing interpolation between them. For example, this apparatus detects derivative coefficients in a frequency band of the lowest frequency and a frequency band of the highest frequency, and connects the detected derivative coefficients with a straight line. With regard to the remaining frequency bands, the apparatus uses the values of corresponding frequencies on the obtained straight line. Alternatively, it is sufficient to detect derivative coefficients with respect to a plurality of frequencies including not only frequencies at two end points but also a frequency at a middle point, connect the results with a straight line or a curve of a proper order, and perform the same processing as described above. Obviously, in this case, power correction is performed for each frequency band.

Note that when measurement results or processed measurement results in several frequency bands are applied to other frequency bands, or when key features are compared among different frequency bands, the magnitude of each key feature may be slightly different to each other due to the characteristic difference in detection circuits for the respective frequency bands. If the receiver knows such differences in characteristic, it is preferable to perform determination using the result corrected by such values.

(Detection of Ramp-Down)

As an application of this embodiment, for example, it is possible to detect the end of communication by storing in advance not only the key feature of ramp-up of a licensed terminal or licensed system but also the key feature of ramp-down and performing detection similar to that described above. However, the receiver must continuously perform receiving operation even after the transmission stop when the receiver has stopped transmission in the frequency band of interest and is not communicating with the transmitter anymore.

(Application to Transmitter)

A detection mechanism like that of this embodiment may be included in a transmitter which performs carrier sensing and the transmitter may detect an artificial change. That is, when a ramp-up waveform is observed in a carrier sense period, a communication system is identified by using the arrangement of the embodiment. This arrangement can be applied for a case wherein a whole ramp-up waveform can be roughly observed during one carrier sense period. If the ramp-up time is sufficiently longer than the time slot length, it is possible to perform comprehensive determination through a plurality of carrier sense periods. If the determination result indicates that the radio wave is obviously from an unlicensed system, and the radio wave does not considerably affect the receiving sensitivity, transmission may not be stopped.

Figure 4:
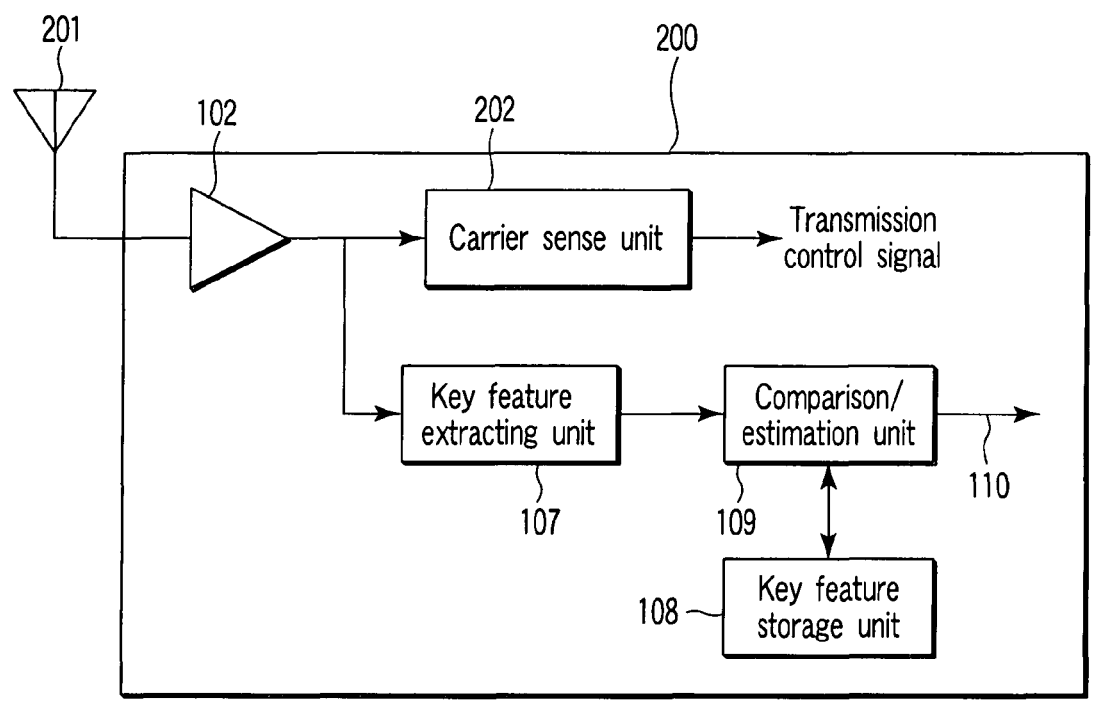
FIG. 4 is a block diagram showing a communication apparatus when the communication apparatus of this embodiment is a transmitter.

FIG. 4 shows a transmitter as a communication apparatus according to this embodiment in this case. The same reference numerals as those of the apparatus described above denote the same parts, and a repetitive description will be omitted. This is the form of detecting an artificial change like that shown in (B) of FIG. 3B. As in the case shown in FIG. 2, the carrier sense unit 202 periodically performs carrier sensing in the frequency band which the transmitter 200 uses. Upon detecting transmission from the licensed system terminal 250 as a result of carrier sensing, the carrier sense unit 202 outputs a transmission control signal containing a command to stop the use of the frequency band.

(Retransmission Determination)

The form of using a detection result obtained in this embodiment for retransmission determination will be described.

The receiver and transmitter of this embodiment have at least a communication function capable of performing transmission/reception through a control channel. Although a control channel may be implemented in any form, the channel should have a transmission capacity large enough to allow exchange of control information associated with retransmission. Moreover, the transmitter and the receiver exchange control information described above through the control channel in addition to retransmission information.

Assume a state wherein a plurality of frequency bands are simultaneously used, and data, i.e., blocks, flow in a plurality of frequency bands in the same time slot as shown in FIG. 6.

As shown in (A) to (F) of FIG. 10, assume a system configured to generate blocks by performing error correction (FEC: Forward Error Correction) and interleave (IL: interleave) processing ((B) of FIG. 10) for packet data to be transmitted ((A) of FIG. 10), dividing the data into block data ((C) of FIG. 10), and adding block headers which are error-correction-coded ((E) of FIG. 10) by attaching error detection codes ((D) of FIG. 10) thereto.

Assume that the receiver performs error correction decoding of only a block header to detect an error upon receiving each frequency band when determining a retransmission block. In this system, additional error correction coding is performed only on block headers and error is detected only in block headers in order to reduce the processing amount for finely divided blocks and reduce the load on the receiver.

In such a retransmission processing system, a block like a block B in FIG. 6 has a block header without any error, even if the rear portion of the block transmitted in f2 is not received, therefore the block may not be recognized as an erroneous block. However, using this method together with the form in FIG. 1 makes it possible to detect that the block B is erroneous, because the detection of a power change indicates that the block has not been properly received in the third transmission period in f2.

(Arrangement of Receiver)

Figure 11:
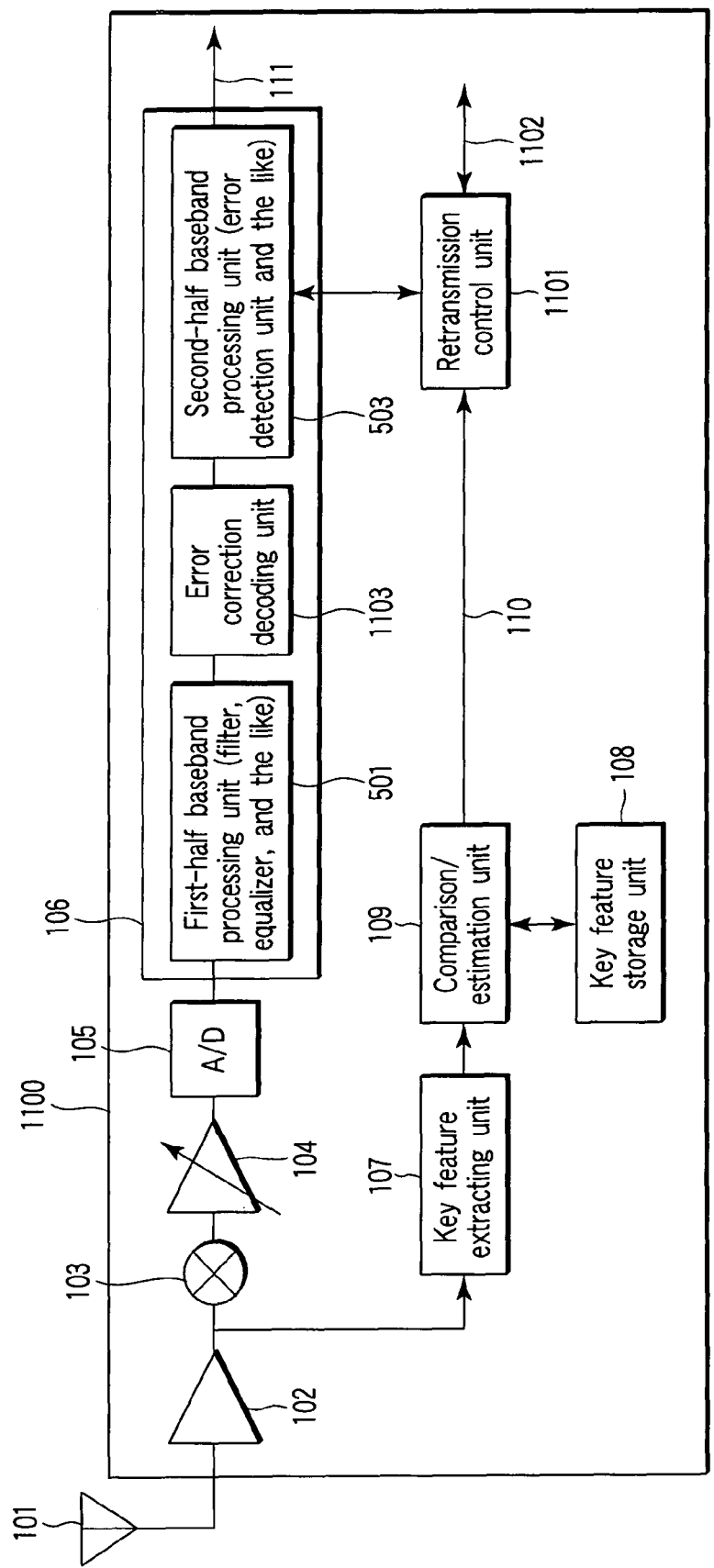
FIG. 11 is a block diagram showing the communication apparatus of this embodiment when retransmission control is performed.

FIG. 11 shows the arrangement of the receiver. The arrangement of the baseband processing unit 106 based on the arrangement in FIG. 1 is similar to that shown in FIG. 5. Note that an error correction decoding unit 1103 performs error correction decoding associated with block headers, and the second-half baseband processing unit 503 performs deinterleaving and error correction decoding associated with packets. The second-half baseband processing unit 503 which performs error detection and the like notifies a retransmission control unit 1101 of an erroneous block upon detection of an error in the block header.

The comparison/estimation unit 109 notifies the retransmission control unit 1101 that no data has been received with respect to the third transmission period in f2 in FIG. 6. The retransmission control unit 1101 inquires of the second-half baseband processing unit 503 if it is determined that a block corresponding to that portion is erroneous. If it is determined that the block is not erroneous, the retransmission control unit 1101 adds the block to an erroneous block. This makes it possible to detect an erroneous block with higher accuracy. The retransmission control unit 1101 outputs, from a retransmission control information output terminal 1102, information for requesting the transmitter to perform retransmission through the control channel.

Note that the comparison/estimation unit 109 notifies the retransmission control unit 1101 of information indicating that interference has been superimposed on the transmission in the second transmission period in f2 in FIG. 6, and, if possible, an estimated signal-to-noise-interference ratio and information about a portion in the transmission period in which large interference seems to be superimposed.

First of all, the retransmission control unit 1101 inquires of the second-half baseband processing unit 503 if it is determined that a block corresponding to the portion is erroneous. In this case, it may be possible to correct a block by error correction depending on the magnitude of interference, and hence it can be determined from the magnitude of superimposed interference whether the error falls within a range of error correction, i.e., whether retransmission is required. Alternatively, since interference large enough to allow event detection is superimposed on the block, it can be determined that this block must be retransmitted.

In order to make these determinations, it is necessary to know in advance which block has been received in which time slot in which frequency band. For this purpose, when dividing a packet into blocks, the first-half baseband processing unit 501 may add these pieces of information to the blocks and supply them together to the subsequent stage.

The second-half baseband processing unit 503 holds a packet including an erroneous block in a storage unit (not shown) until all the blocks are prepared as a result of retransmission. The second-half baseband processing unit 503 performs deinterleaving, error correction decoding, and the like associated with a packet in which all the blocks are prepared without any error upon extracting and arranging packet data portions, and outputs the resultant packet from the data output terminal 111.

(Modification)

Figure 12:
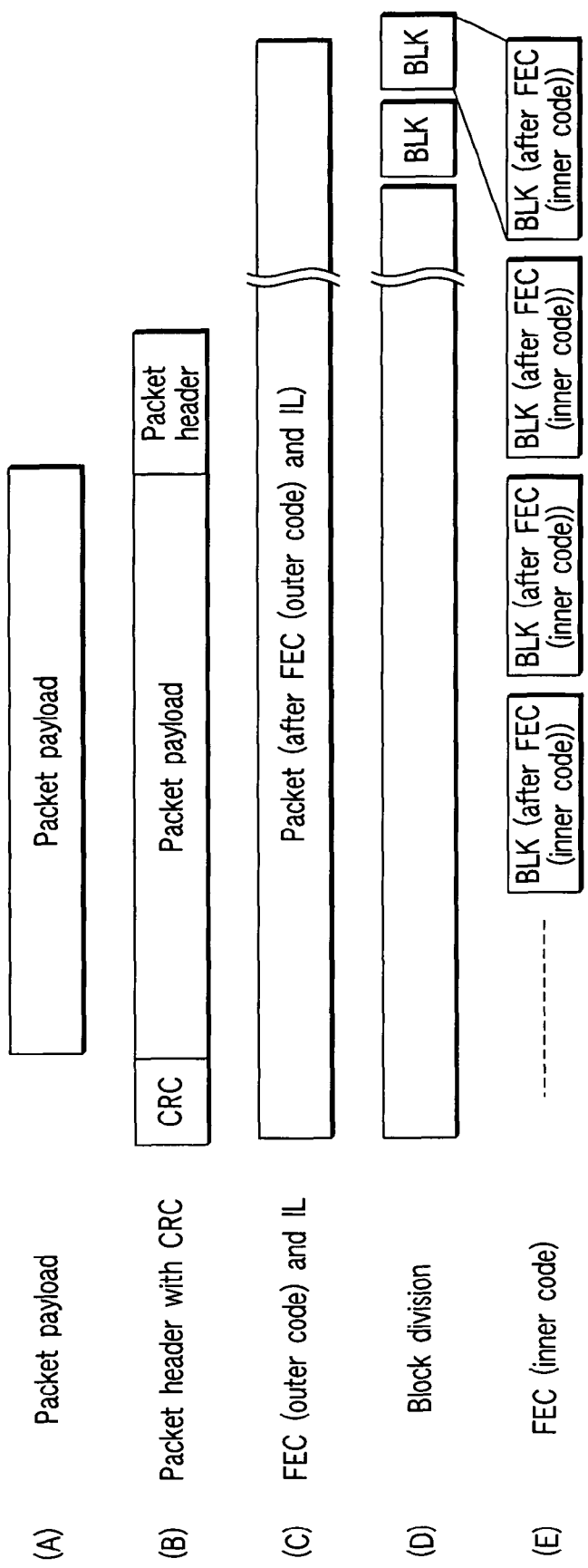
FIG. 12 is a view for explaining an example of the operation of the communication apparatus of this embodiment when it is applied to retransmission.

As another method of dividing a packet into blocks and retransmitting each block, the following method can be used. Using the above event detection function together with this method will greatly improve the performance owing to a synergistic effect. (A) to (E) of FIG. 12 show processing on the transmission side. (A) to (E) of FIG. 13 show processing on the receiver side. FIG. 14 is a block diagram of a portion near the baseband processing unit of the receiver. This portion uses a method using inner and outer codes.

As shown in (A) to (E) of FIG. 12, first of all, the transmitter adds a packet header and an error detection code (CRC: Cyclic Redundancy Check) to a packet payload ((A) of FIG. 12) to generate a packet ((B) of FIG. 12). After performing error correction coding of the generated packet with an outer code, the transmitter performs interleaving on a packet basis ((C) of FIG. 12), and divides the packet into small blocks ((D) of FIG. 12).

The transmitter divides a packet into blocks for the following reason. The communication system in which an abrupt transmission stop occurs upon detection of interference, on which this embodiment is based, receives no data due to a transmission stop. If packets fail due to data which have not been received, the system frequently retransmits packets, resulting in a decrease in throughput. Retransmitting only a portion which has not arrived due to a transmission stop will prevent retransmitted data from worsening the traffic situation.

Upon dividing the packets into blocks, the transmitter performs error correction of each block by using an inner code ((E) of FIG. 12). The transmitter then converts each block into a radio signal in a proper form like that shown in FIG. 6, and transmits it.

As shown in FIG. 14, in the receiver, the first-half baseband processing unit 501 re-divides the received radio signal into blocks upon performing filtering, equalization, and the like as needed ((A) of FIG. 13). A first-half error correction decoding unit 1401 performs error correction decoding of the inner code ((B) of FIG. 13), and adds detected likelihood information to each block ((C) of FIG. 13). The signal to which the likelihood information is added is stored in a storage unit (not shown).

A second-half error correction decoding unit 1402 deinterleaves these blocks and performs error correction decoding with an outer code to reproduce a packet ((D) of FIG. 13). Subsequently, the second-half baseband processing unit 503 performs error detection (CRC check) with respect to the packet. Upon detecting an error, the second-half baseband processing unit 503 notifies a retransmission control unit 1001 of the corresponding information.

On the other hand, as has been described above, the receiver detects an event from the key feature of a power change in each received frequency band. The retransmission control unit 1001 is notified of the detection result.

Upon being notified by the second-half baseband processing unit 503 of an erroneous packet detection, the retransmission control unit 1001 refers to the stored signals with likelihood added and selects blocks in which an error is likely to have occurred based on the likelihoods. In addition, the retransmission control unit 1001 selects, on the basis of the comparison/estimation result, a block in which en error is likely to have occurred regardless of likelihoods. Such blocks are, for example, blocks which have been partly or entirely received in the second half of the second time slot and the third time slot in f2 in FIG. 6. Upon selecting these blocks, the retransmission control unit 1001 outputs a retransmission request to be transmitted through a control channel to the transmitter from a retransmission control information output terminal 1002.

By determination based on only likelihoods, it may be impossible to determine a portion which causes an error even with a high likelihood as in a case wherein power increases due to interference. Using event detection information together in this manner makes it possible to avoid such situation and retransmit a portion or block which causes an error upon accurately specifying it. This makes it possible to suppress an increase in the delay of a packet and further suppress the retransmission traffic by reducing unnecessary retransmissions.

In this case, if it is determined that a block whose likelihood has not been properly determined due to interference is the main cause of a packet error, blocks having evaded event detection and selected only based on likelihoods, which have relatively high likelihood can be excluded from retransmission targets. This is because if erroneous packet errors due to interference or transmission stop has been properly received, other errors due to fading will fall within the error correction range. This can suppress the retransmission traffic.

Obviously, in the retransmission methods shown in (A) to (E) of FIG. 10 and (A) to (E) of FIG. 12 and FIGS. 13 and 14, an arrangement can be configured to change the likelihood based on a key feature comparison/estimation result at the time of error correction decoding, as shown in FIG. 5. The arrangement shown in (A) to (E) of FIG. 12 and FIGS. 13 and 14, in particular, can select blocks to be retransmitted completely on the basis of only likelihoods, if the likelihoods for error correction have been properly changed based on event detection.

With regard to a portion like the third time slot in f2 in FIG. 6 in which no data has been received, however, directly selecting a block by using a comparison/estimation result is simpler and clearer than re-determining that no data has been received on the basis of likelihood. It is therefore preferable to use both the methods together. In addition, it is possible to take an arrangement configured to store, in advance, data added with a comparison/estimation result and use the added comparison/estimation result when changing likelihood information.

As a method of making frequency bands, time slots, and blocks correspond to each other, the same method as that in the form shown in (A) to (F) of FIG. 10 may be used.

In addition, as another retransmission method, in a method of performing error detection on a packet basis and then selecting blocks to be retransmitted on a block basis like the method shown in (A) to (E) of FIG. 12 and FIGS. 13 and 14, it is possible to use a block header as shown in (A) to (F) of FIG. 10 and detect an error in a block header instead of the likelihood detection of inner codes.

That is, first of all, a transmitter performs processing up to block data division in steps like those shown in (A) to (D) of FIG. 12. In this case, error correction coding by an outer code is only error correction coding with respect to a packet, and hence a sufficient coding ratio is necessary. The apparatus then generates block headers by processing corresponding to (D) to (F) of FIG. 10, and adds them to block data portions divided in the step in (D) of FIG. 12, thereby generating blocks. The transmitter converts the blocks into a radio signal in a proper form like that shown in FIG. 6 and transmits it.

Upon receiving the radio signal, the receiver re-divides the signal into blocks upon proper processing. The receiver separates the block headers from the divided blocks and performs error detection (CRC) with respect to the block headers. The receiver stores the result together with block data. The receiver collects the block data on a packet basis and performs deinterleaving and error correction decoding to reproduce a packet. The receiver then performs error detection (CRC check) with respect to the packet. Upon detecting an error as a result of this operation, the receiver selects a block which causes the packet error, on the basis of both a block having an erroneous block header as in the case shown in (A) to (F) of FIG. 10 and the event detection result. This allows the receiver to select the block having the erroneous block header and a block which seems to have an error in its block data portion even if the block header is not erroneous, and to request the retransmission of the selected blocks.

According to the method of requesting retransmission upon selecting blocks from an error detection result on a packet in this manner, even if errors are detected in several blocks, packets which can be remedied by error correction and interleaving applied to the packet can be remedied and output. As compared with the method of performing error detection on a block basis and requesting retransmission on the basis of only the detection result, the above method can reduce the number of blocks to be retransmitted. However, since it is difficult to select blocks for retransmission, event detection based on the observation of a power change as in this embodiment makes it possible to improve the accuracy of block selection and reduce unnecessary retransmissions.

According to the embodiment described above, it is possible to discriminate an artificial change such as the stop of transmission of a cognitive terminal accompanied by transmission of a licensed terminal from a change resulting from natural phenomena such as fading. This can prevent false detection of a signal. Therefore, the decoding performance in the subsequent operation can be improved. In addition, the receiver can improve the accuracy of selecting blocks for retransmission by performing both the artificial change detection and error detection, thus improving the communication performance.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus, comprising:
an extraction unit configured to extract a reception key feature of a temporal change in received power in each frequency band contained in a received signal;
a storage unit configured to store, in correspondence with one another, a system name of at least one system which uses the frequency band, event information indicating that a communication apparatus belonging to the system starts or stops transmission, and at least one transmission key feature of a temporal waveform change shape of a transmission signal from a communication apparatus belonging to the system, at least one transmission key feature corresponding to the event information;
a determination unit configured to determine whether there is any transmission key feature matching the reception key feature, by comparing the reception key feature with the transmission key feature; and
a selection unit configured to select, when the determination unit determines that there is a matched transmission key feature, the event information and the system name which correspond to the transmission key feature from the storage unit, wherein
the extraction unit extracts a derivative of a temporal waveform change shape of the received power as the reception key feature,
the storage unit stores a threshold corresponding to the temporal waveform change shape of the transmission signal corresponding to the event information, and
the determination unit compares the extracted derivative with the stored threshold with reference to signs and magnitudes, and determines that key features match, if a sign of the extracted derivative equals to a sign of the stored threshold match and a magnitude of the extracted derivative is larger than a magnitude of the stored threshold.

2. The apparatus according to claim 1, wherein the storage unit contains the event information indicating that a communication apparatus belonging to a self system detects transmission from another communication apparatus belonging to another system and stops transmission, and a corresponding key feature of a temporal waveform change shape of a transmission signal from the communication apparatus belonging to the self system.

3. The apparatus according to claim 1, wherein
the extraction unit extracts a temporal waveform change shape of the received power as the reception key feature, and
the determination unit calculates a correlation value between the extracted temporal waveform change shape and the stored temporal waveform change shape in a predetermined period, and determines whether the correlation value is not less than a threshold.

4. The apparatus according to claim 1, wherein
the extraction unit extracts, as the reception key feature, an average received power value for each transmission period of a time slot defined by a communication system to which the apparatus belongs,
the storage unit stores the temporal waveform change shape of the transmission signal corresponding to the event information as a shape of an average transmitted power value for the time slot, and
the determination unit determines whether there is any transmission key feature matching the reception key feature by comparing the shape of the average received power value with the shape of the average transmitted power value.

5. The apparatus according to claim 4, further comprising:
a generating unit configured to generate a control signal for controlling a gain by using received power information, and
a control unit configured to control the gain in accordance with the control signal, and wherein
the extraction unit detects the average received power value in the time slot by using the received power information.

6. The apparatus according to claim 1, wherein the storage unit has a plurality of kinds of key features as the transmission key features, and stores a combination of the key features and one piece of the event information in correspondence with each other.

7. The apparatus according to claim 1, wherein if it is determined that there is the transmission key feature which matches the reception key feature in a frequency band, the determination unit compares a reception key feature corresponding to a frequency band other than the matching-achieved frequency band with the transmission key feature.

8. The apparatus according to claim 1, wherein the storage unit stores, as the transmission key feature, a key feature of the temporal waveform change shape when a transmitter of a system having priority of use in the each frequency band starts transmission.

9. The apparatus according to claim 1, wherein the storage unit stores, as the transmission key feature, a first key feature of the temporal waveform change shape when a transmitter of a system having no priority of use in the each frequency band starts transmission.

10. The apparatus according to claim 9, further comprising a notification unit configured to notify the communication apparatus belonging to a self system of a request to cancel transmission stop, if the determination unit determines that the reception key feature matches the first key feature and matches a key feature of a temporal waveform change shape when the communication apparatus belonging to the self system detects transmission from a communication apparatus belonging to another system and stops transmission.

11. The apparatus according to claim 1, further comprising a demodulation unit configured to demodulate the received signal, and wherein
when determining that the reception key feature extracted in a first frequency band matches a key feature of a temporal waveform change shape when the communication apparatus belonging to the self system detects other transmission and stops transmission, the demodulation unit stops to demodulate a signal in a time slot including a time when the key features matching is detected in the first frequency band.

12. A communication apparatus, comprising:
an extraction unit configured to extract a reception key feature of a temporal change in received power in each frequency band contained in a received signal;
a storage unit configured to store, in correspondence with one another, a system name of at least one system which uses the frequency band, event information indicating that a communication apparatus belonging to the system starts or stops transmission, and at least one transmission key feature of a temporal waveform change shape of a transmission signal from a communication apparatus belonging to the system, at least one transmission key feature corresponding to the event information;
a determination unit configured to determine whether there is any transmission key feature matching the reception key feature, by comparing the reception key feature with the transmission key feature; and
a selection unit configured to select, when the determination unit determines that there is a matched transmission key feature, the event information and the system name which correspond to the transmission key feature from the storage unit, wherein the extraction unit includes:
a calculation unit configured to extract a slow change in key feature measured during a predetermined past period of time from a current point of time in a given frequency band;
a prediction unit configured to predict a change in key feature after a lapse of a predetermined period of time on the basis of the extracted slow change; and
a correction unit configured to generate a corrected key feature by correcting the reception key feature by subtracting the predicted change from the reception key feature detected at a time corresponding to the lapse of the predetermined period of time, and wherein
the determination unit compares the corrected key feature with the transmission key feature.

13. A communication apparatus, comprising:
an extraction unit configured to extract a reception key feature of a temporal change in received power in each frequency band contained in a received signal;
a storage unit configured to store, in correspondence with one another, a system name of at least one system which uses the frequency band, event information indicating that a communication apparatus belonging to the system starts or stops transmission, and at least one transmission key feature of a temporal waveform change shape of a transmission signal from a communication apparatus belonging to the system, at least one transmission key feature corresponding to the event information;
a determination unit configured to determine whether there is any transmission key feature matching the reception key feature, by comparing the reception key feature with the transmission key feature;
a selection unit configured to select, when the determination unit determines that there is a matched transmission key feature, the event information and the system name which correspond to the transmission key feature from the storage unit;

an instructing unit configured to generate an instruction to change a likelihood used for error correction decoding; and a decoding unit configured to perform error correction decoding after changing a likelihood in accordance with the instruction, and wherein if it is determined that the reception key feature extracted in a second frequency band matches a key feature of a temporal waveform change shape of a transmission signal when a communication apparatus of another system which uses each frequency band which a communication apparatus belonging to a self system receives starts transmission, the instructing unit decreases a likelihood corresponding to a time slot including a time when it is determined that the key feature of the signal matches the key feature of a signal received in the second frequency band.

14. A communication apparatus, comprising:

an extraction unit configured to extract a reception key feature of a temporal change in received power in each frequency band contained in a received signal;

a storage unit configured to store, in correspondence with one another, a system name of at least one system which uses the frequency band, event information indicating that a communication apparatus belonging to the system starts or stops transmission, and at least one transmission key feature of a temporal waveform change shape of a transmission signal from a communication apparatus belonging to the system, at least one transmission key feature corresponding to the event information;

a determination unit configured to determine whether there is any transmission key feature matching the reception key feature, by comparing the reception key feature with the transmission key feature;

a selection unit configured to select, when the determination unit determines that there is a matched transmission key feature, the event information and the system name which correspond to the transmission key feature from the storage unit;

a requesting unit configured to issue a retransmission request to a communication apparatus belonging to a self system for each block constituting the signal;

a correction unit configured to perform error correction of the signal; and a block selection unit configured to select a block for which a retransmission request is to be issued, on the basis of an error correction result obtained by the correction unit and event information and a system which are selected by the selection unit, and wherein the requesting unit issues a retransmission request for the block for which the retransmission request is to be issued.

15. The apparatus according to claim 14, further comprising:

a block error detection unit configured to perform error detection with respect to the block, a packet error detection unit configured to perform error detection for each packet constituted by a plurality of blocks, and a block selection unit configured to, when an error is detected in the packet, select a block for which a retransmission request is to be issued, on the basis of an error detection result on a block contained in the packet which is obtained by the block error detection unit and event information and a system which are selected by the selection unit, and wherein the requesting unit issues the retransmission request for the block selected by the block selection unit.

16. The apparatus according to claim 14, further comprising:

a packet error detection unit configured to perform error detection for each packet constituted by a plurality of blocks, and a block selection unit configured to, when an error is detected in the packet, select a block for which a retransmission request is to be issued, on the basis of likelihood information used for error correction by the correction unit and event information and a system which are selected by the selection unit.

* * * * *